United States Patent [19]

Tsuji et al.

[11] Patent Number: 5,056,629
[45] Date of Patent: * Oct. 15, 1991

[54] DISPLAY APPARATUS FOR ELEVATOR

[75] Inventors: Shintaro Tsuji; Yasuhiro Nagata, both of Inazawa, Japan

[73] Assignee: Mitsubishi Denki Kabushiki Kaisha, Japan

[*] Notice: The portion of the term of this patent subsequent to Feb. 15, 2006 has been disclaimed.

[21] Appl. No.: 16,388

[22] Filed: Feb. 19, 1987

[30] Foreign Application Priority Data

Feb. 25, 1986 [JP] Japan ................................ 61-39614
Feb. 25, 1986 [JP] Japan ................................ 61-39616
Mar. 20, 1986 [JP] Japan ................................ 61-62656
Mar. 20, 1986 [JP] Japan ................................ 61-62657

[51] Int. Cl.$^5$ ............................................ B66B 3/00
[52] U.S. Cl. ................................. 187/139; 340/724
[58] Field of Search ............... 187/130, 139; 340/700, 340/720, 724, 726, 815.01, 815.24; 364/513, 514

[56] References Cited

U.S. PATENT DOCUMENTS 4,400,786  8/1983  Mandel et al. ..................... 364/513
4,400,787  8/1983  Mandel et al. ..................... 364/513
4,577,177  3/1986  Marubashi ......................... 187/139
4,660,031  4/1987  Buchas .......................... 340/726 X

FOREIGN PATENT DOCUMENTS 60-100379  7/1985  Japan .
60-167871  8/1985  Japan .

Primary Examiner—A. D. Pellinen
Assistant Examiner—W. E. Duncanson, Jr.
Attorney, Agent, or Firm—Leydig, Voit & Mayer

[57] ABSTRACT

A display apparatus for an elevator in which a message to be reported to the users of the elevator, such as the running status of the elevator, is displayed by a display unit disposed in a cage or a hall, a control is performed by a display control device so that the message to be reported may be displayed in a designated display aspect on the display unit, and the designation of the display aspect and the simulative display of a message in an aspect corresponding to the designated display aspect are carried out with a display aspect correction device, whereby the display as intended can be presented.

9 Claims, 17 Drawing Sheets

← SCROLL DIR

← SCROLL DIR

FIG. 8
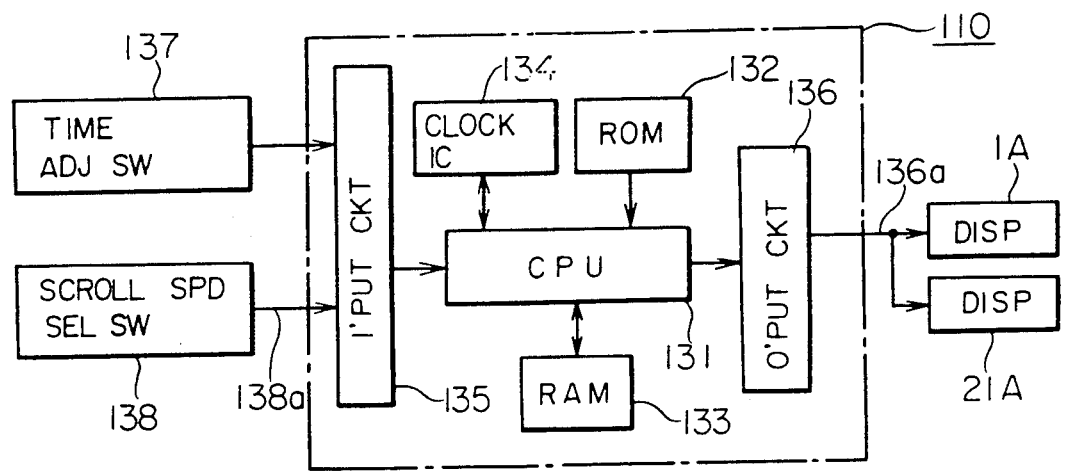
FIG. 9
| | |
|---|---|
| S(1) | 100 |
| S(2) | 150 |
| S(3) | 200 |
| S(4) | 250 |
| S(5) | 300 |
| F(1) | 50 |
| F(2) | 50 |
| F(3) | 100 |
| F(4) | 100 |
| F(5) | 150 |
132
FIG. 11
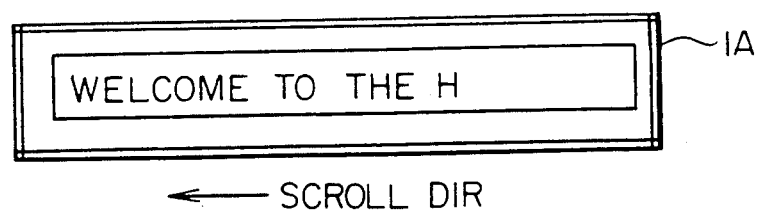
← SCROLL DIR

| Label | Content |
|---|---|
| MS(1) | EARTHQUAKE EMERGENCY! PLEASE GET OFF WHEN DOORS OPEN. |
| MS(2) | FIRE EMERGENCY! PLEASE GET OFF WHEN DOORS OPEN. |
| MS(3) | OVERLOAD! SOMEONE PLEASE STEP OUT. |
| LS(1) | 53 |
| LS(2) | 47 |
| LS(3) | 34 |
| SS(1) | 100 |
| SS(2) | 100 |
| SS(3) | 150 |

| Label | Content |
|---|---|
| MM(1) | EARTHQUAKE EMERGENCY! PLEASE WAIT A MINUTE AND GET OFF. |
| MM(2) | |
| MM(3) | |
| LM(1) | 55 |
| LM(2) | 0 |
| LM(3) | 0 |
| SM(1) | 200 |
| SM(2) | 0 |
| SM(3) | 0 |
| DA | EARTHQUAKE EMERGENCY! PLEASE WAIT A MINUTE AND GET OFF. |
| DB | IT IS 11:00, NOW. |
| LA | 55 |
| LB | 16 |
| SA | 200 |
| I | 1 |
| J | 1 |
| T | 11:00 |
| K | 1 |

DISPLAY APPARATUS FOR ELEVATOR

BACKGROUND OF THE INVENTION

This invention relates to a display apparatus for an elevator in which, for example, information in an emergency such as a fire, earthquake or power failure, elevator information such as a guide for a "car full" condition, and general information such as a time or weather forecast are displayed on a display unit disposed in the cage or hall of the elevator.

The period of time during which the users of an elevator are waiting for the arrival of a cage in an elevator hall or the period of time during which they are riding in the cage is essentially a wasteful period of time. In order to utilize this time effectively, there has been proposed an apparatus wherein a display device is disposed in the elevator hall or in the cage, and various items of information (for example, a weather forecast, a piece of news, an advertisement, a show guide and a conference guide), in the shapes of letters and patterns are displayed (hereinbelow, the letters and patterns shall be called "messages"). In addition, there has been proposed a guide apparatus for an elevator such as disclosed in Japanese Utility Model Registration Application Land-open No. 60-100379 or Japanese Patent Application Laid-open No. 60-167871 wherein a cage position, a running direction, a next stopping floor, etc. based on the operating information of the elevator are displayed on a display device to provide effective user utilization of the elevator. Besides, there has been put into practical use an apparatus wherein while being scrolled, time and other guidance information are displayed on a simple display device which can display only ten and odd characters at any given time.

In the apparatus which displays the cage position, running direction and next stopping floor as stated above, the contents change with the operation of the cage. In contrast, as regards, for example, guidance information to be displayed during emergencies such as a fire, earthquake and power failure or guidance information to be displayed when a door is forcibly closed and when the cage is full, the display contents (messages) are almost stereotyped phrases and do not differ in relation to the buildings used. It is accordingly common that a storage device (for example, ROM) fixedly storing the messages to be displayed, has pre-stored in a factory the messages to be displayed. This measure has the advantage that, since the storage devices of the same sort can be fabricated in large quantities, the cost of the apparatus can be lowered.

The prior-art display apparatus for an elevator is constructed as described above. Therefore, when it is requested in some buildings to alter the guidance display messages or the display aspects (i.e., a scroll speed, a flickering display, etc.), instructions for new messages or display aspects are written into the storage device by the use of a writing device. Since the writing device cannot be manipulated freely by anyone, the alterations are made by an expert in the elevator. This has led to the problem that time and labor are expended on the alterations, to raise the cost. Besides, when the above alterations of the messages or display aspects are repeated, they become more troublesome to cope with. It is also considered to adopt the method wherein as disclosed in Japanese Patent Application Laid-open No. 60-167871 a freely accessible storage device (for example, RAM) is applied and has messages written thereinto in a site (such as elevator machinery room). Since, however, the expert must write similar messages by hand in most buildings, this measure requires time and labor and increases the cost.

In the guidance apparatus for an elevator described in the aforementioned Japanese Patent Application Laid-open No. 60-167871, an MPU (micro-processing unit) is disposed on an elevator monitoring panel in a caretaker's room, guidance information items are generated with a keyboard which is connected to the MPU, and the guidance information items are altered after new information items have been acknowledge with a CRT. In case of generating guidance information, the CRT is indispensable as understood from word processors by way of example.

The prior-art display apparatus for an elevator is constructed as described above. Therefore, when the display aspects (such as the speed of a scroll display mode and the flickering period and flickering rate of a flickering display mode) of messages for displaying the guidance information items put into the shapes of letters and patterns are to be altered, it has been considered to merely dispose correction devices such as switches, and it has been difficult to alter the display aspects as desired and to acknowledge the alterations. Accordingly, in a case where by way of example, a caretaker has altered the scroll speed by manipulating one of the switches which specifies "200 msec per character", whether or not a speed which the caretaker himself/herself expects in his/her mind coincides with the speed "200 msec per character" is not known before the caretaker judges it by actually watching a display device in a cage or a hall. Moreover, when the scroll speed of the messages actually displayed is not as expected, the caretaker may have to return to his/her room and manipulate the switches again and then acknowledge the scroll speed in the cage or hall again. Such a situation is not limited to the scroll speed, but a similar problem takes place in case of altering the flickering rate or flickering period of the flickering display mode.

That is, when the speed of the scroll display is altered as described above in the mode in which a character string to be displayed is displayed while being flickered wholly or partly in order to attract the attention of users, there has occurred the problem that the flickering period or the flickering rate of the display fails to match with the scroll speed, so the message becomes illegible. Especially in a case where the display device presents a display in single-character unit, the character string scrolls every character, and hence, the legibility of the character string is greatly affected by whether or not the flickering period or flickering rate matches with the scroll speed.

Meanwhile, observation information items concerning weather conditions such as the appearance of the sky, wind, rain and temperature, or information items concerning the market trends of the price index of stocks, the rate of exchange, etc. have contents which fluctuate with the lapse of time. In case of displaying such information items on the display device, the functions of setting the appearance of the sky, the probability of rainfall, the temperature etc. or the price index, the exchange rate etc. are needed. In order to apply such information items as inputs, the guidance apparatus for an elevator described in the aforementioned official gazette of Japanese Patent Application Laid-open No. 60-167871 teaches an aspect of performance wherein an MPU (micro-processing unit) is disposed on an elevator monitoring panel in a caretaker's room, guidance information items are generated with a keyboard which is connected to the MPU, and the guidance information items are altered after new information items have been acknowledged with a CRT.

Besides, a display control apparatus for an elevator disclosed in the specification and drawings attached to Japanese Patent Application No. 60-243337 teaches an aspect of performance wherein the contents of elements fluctuating with the lapse of time, such as weather information and market information, are designated with switches.

However, when the caretaker of a building fails to update the contents of the information, untimely information is displayed on the display device. This has incurred the very serious problem that users make judgements based on the erroneous information.

SUMMARY OF THE INVENTION

This invention has been made in order to eliminate the problems as mentioned above, and has for its object to provide a display apparatus for an elevator in which, even when it has become necessary to alter any of messages or display aspects after the start of the operation of the elevator, the correction is easy, and nevertheless, does not raise the cost of the whole system.

Another object of this invention is to provide a display apparatus for an elevator in which, even when a device for correcting display aspects is installed in a place distant from a display device, a desired display aspect can be established without expending labor.

Still another object of this invention is to provide a display apparatus for an elevator in which, even when a scroll speed has been altered with a correction device, messages displayed flickeringly are legible.

Still another object of this invention is to provide a display apparatus for an elevator in which, even when the caretaker or the like of a building has failed to update the information content, the untimely information does not trouble users.

The display apparatus for an elevator according to this invention is so constructed that messages to be reported to passengers, such as the running statuses of the elevator, are displayed by a display unit which is disposed in the cage or hall of the elevator, that the messages to be sent to the display unit are controlled by a display control device so as to be displayed in a designated display aspect, and that the designation of the display aspect and the simulative display of the messages in an aspect corresponding to the designated display aspect are effected by a display aspect correction device.

In the elevator display apparatus of this invention, simulation means installed on the display aspect correction device for designating and correcting a display aspect displays predetermined messages simulatively in an aspect corresponding to the designated display aspect.

A display apparatus for an elevator according to another embodiment of this invention is so constructed that preset items of fixed information are stored in storage means, that correction information items applied from a correction device are stored in another storage means in a manner to respectively correspond to the fixed information items, that when correction information corresponding to a display command from an elevator control device is not stored in the second-mentioned storage means, the fixed information corresponding thereto is selected from the first-mentioned storage means by selection means for selecting a plurality of items of information of the first-mentioned storage means, while when the correction information corresponding to the display command is stored in the second-mentioned storage means, the stored correction information is selected, and that the selected information is displayed on a display unit which is disposed in the cage or hall of the elevator.

In the elevator display apparatus of the embodiment of this invention, when correction information corresponding to a display command based on running information as applied from the elevator control device is not stored in the second-mentioned storage means, the fixed information corresponding thereto is selected from the first-mentioned storage means, and when the correction information corresponding to the display command is stored in the second-mentioned storage means, the stored correction information is selected, whereupon the selected information is displayed on the display unit.

A display apparatus for an elevator according to still another embodiment of this invention consists in one having a display unit which is disposed in the cage or hall of the elevator and which can simultaneously display a limited number of characters not greater than a prescribed value, storage means for storing a plurality of items of information which are to be displayed on the display unit, selection means for selecting and generating the information stored in the storage means when predetermined conditions have held, and output means for converting the generated information into a character string and for scrollingly displaying the character string at a designated speed on the display unit and also flickeringly displaying the whole or part of the character string in accordance with a parameter determining a display aspect, characterized by a construction in which the scroll speed is altered by scroll speed alteration means, and the parameter is also altered in correspondence with the scroll speed by flickering parameter-setting means.

In the elevator display apparatus of the embodiment of this invention, when the speed at which a predetermined message is scrollingly displayed is altered, the aspect of flickering the displayed is information is conjointly altered.

A display apparatus for an elevator according to a further embodiment of this invention consists in one having a display unit which is disposed in the cage or hall of the elevator, input means for applying as an input the elemental content of information containing an element fluctuant with the lapse of time, and display control means for displaying the information on the display unit in accordance with the input of the input means, characterized by a construction in which upon detecting that the input of the elemental content of the information has not been applied by the input means within a time interval set by inhibition means, a command for inhibiting the display of the information is issued to inhibit the display of the information.

In the elevator display apparatus of the embodiment of this invention, when the input of the fluctuant elemental content of information has not been applied by the input means within a set time interval, the display of the information is inhibited.

BRIEF DESCRIPTION OF THE DRAWINGS

FIGS. 7–11 show a second embodiment of this invention, in which FIG. 7 is a general arrangement diagram of a display apparatus for an elevator, FIG. 8 is a system block diagram of a display control device, FIG. 9 is an arrayal diagram of data stored in a ROM included in the display control device, FIG. 10 is a flow chart showing the operation of the display control device, and FIG. 11 is a diagram showing a display example of a display unit.

FIG. 14 is a table of the contents of data stored in a ROM in FIG. 13, FIG. 15 is a table of the contents of data stored in a RAM in FIG. 13.

FIGS. 21–26 show a fourth embodiment of this invention, in which FIG. 21 is a general arrangement diagram of a display apparatus for an elevator, FIG. 22 is a system block diagram of a display control device, FIG. 23 is an arrayal diagram of data stored in a ROM included in the display control device, FIG. 24 is a flow chart showing the operation of the display control device, and FIGS. 25 and 26 are diagrams each showing a display example.

PREFERRED EMBODIMENTS OF THE INVENTION

Now, an embodiment of this invention will be described with reference to FIGS. 1–6.

Figure 1:
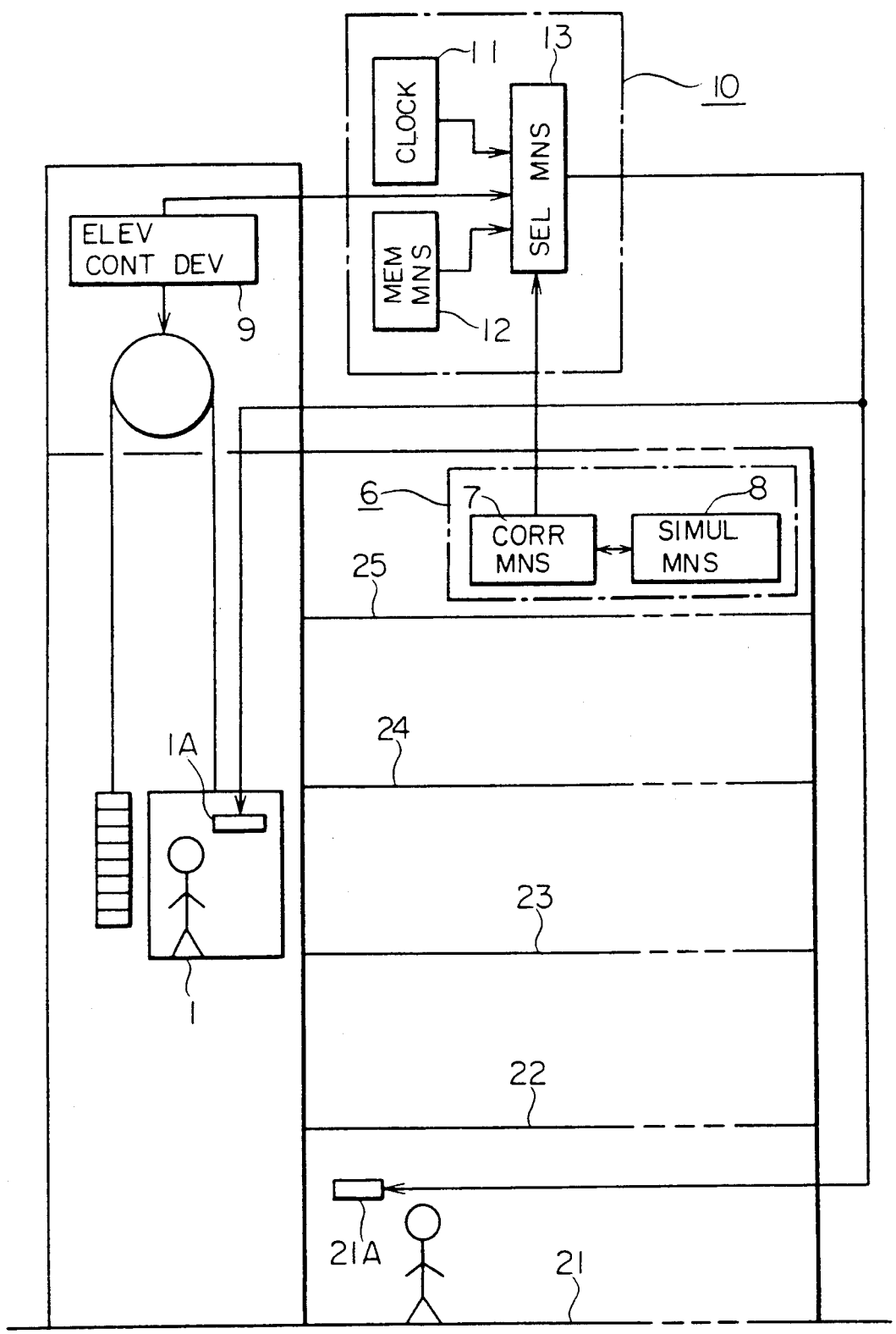
FIG. 1 is a general arrangement diagram of a display apparatus for an elevator according to an embodiment of this invention.

FIG. 1 is a general arrangement diagram of a display apparatus for an elevator in this embodiment. Referring to the figure, numeral 1 indicates the cage of the elevator which is installed in a five-storeyed building. A display unit 1A is disposed in the cage 1, and is made of a well-known fluorescent display tube capable of displaying any desired characters (alphabetic letters, numerals, symbols etc.) up to 16 characters at a time. Numerals 21–25 indicate elevator halls on the first—fifth floors, respectively. A hall display unit 21A similar to the display unit 1A is disposed in the elevator hall 21 of the first floor. Numeral 6 denotes a display aspect correction device which is constructed of correction means 7 for designating the display aspect of a message to be displayed on the display units 1A and 21A, and simulation means 8 for simulatively displaying a predetermined message in an aspect corresponding to the display aspect. Numeral 9 denotes an elevator control device for causing the cage 1 to serve the first—fifth floors. Numeral 10 denotes a display control device for displaying a predetermined message on the display units 1A and 21A. This display control device 10 is constructed of a clock 11 which delivers time information (hour and minutes) expressive of a current time, memory means 12 storing a plurality of items of information to be displayed on the display units 1A and 21A, and selection means 13 for selecting and generating information to-be-displayed from the control information of the elevator control device 9, the time information of the clock 11, and the information stored in the memory means 12, and for delivering the information to the cage display unit 1A and the hall display unit 21A of the first floor so as to be displayed in a display aspect designated by the display aspect correction device 6.

Figure 2:
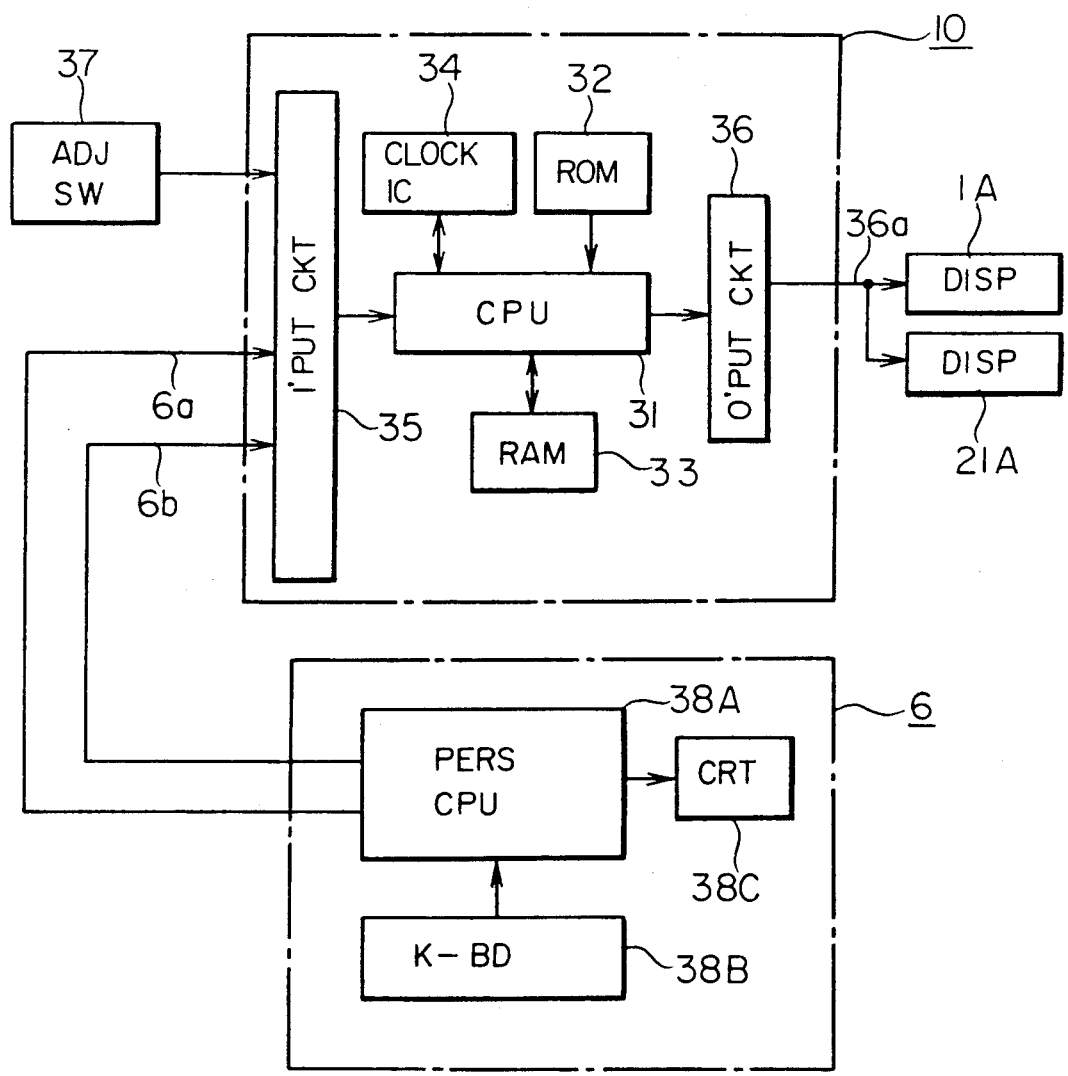
FIG. 2 is a system block diagram of a display control device in FIG. 1.

FIG. 2 is a system block diagram of the display aspect correction device 6 as well as the display control device 10. Referring to the figure, the display control device 10 is materialized by a microcomputer, and it is constructed of a CPU 31, a ROM 32, a RAM 33, a clock IC 34, an input circuit 35 and an output circuit 36. Numeral 37 indicates adjustment switches for adjusting the clock IC 34. A signal 36a which is delivered from the output circuit 36 is a coded display information signal which expresses the message to be displayed on the cage display unit 1A and the hall display unit 21A of the first floor.

The display aspect correction device 6 is constructed of a personal computer 38A, a keyboard 38B and a CRT 38C. A scroll speed signal 6a expresses in "msec" a scroll rate per character of the message (in this embodiment, it is assumed that a flickering period and the scroll speed be equal), while an extinguishing interval signal 6b expresses in "msec" an extinguishing interval within the flickering period of the message.

Next, the operation of the display aspect correction device 6 will be described in accordance with the flow chart thereof shown in FIG. 3. The operation based on this flow chart is executed by a calculation program which is stored in the memory (not shown) of the computer 38A.

Figure 3:
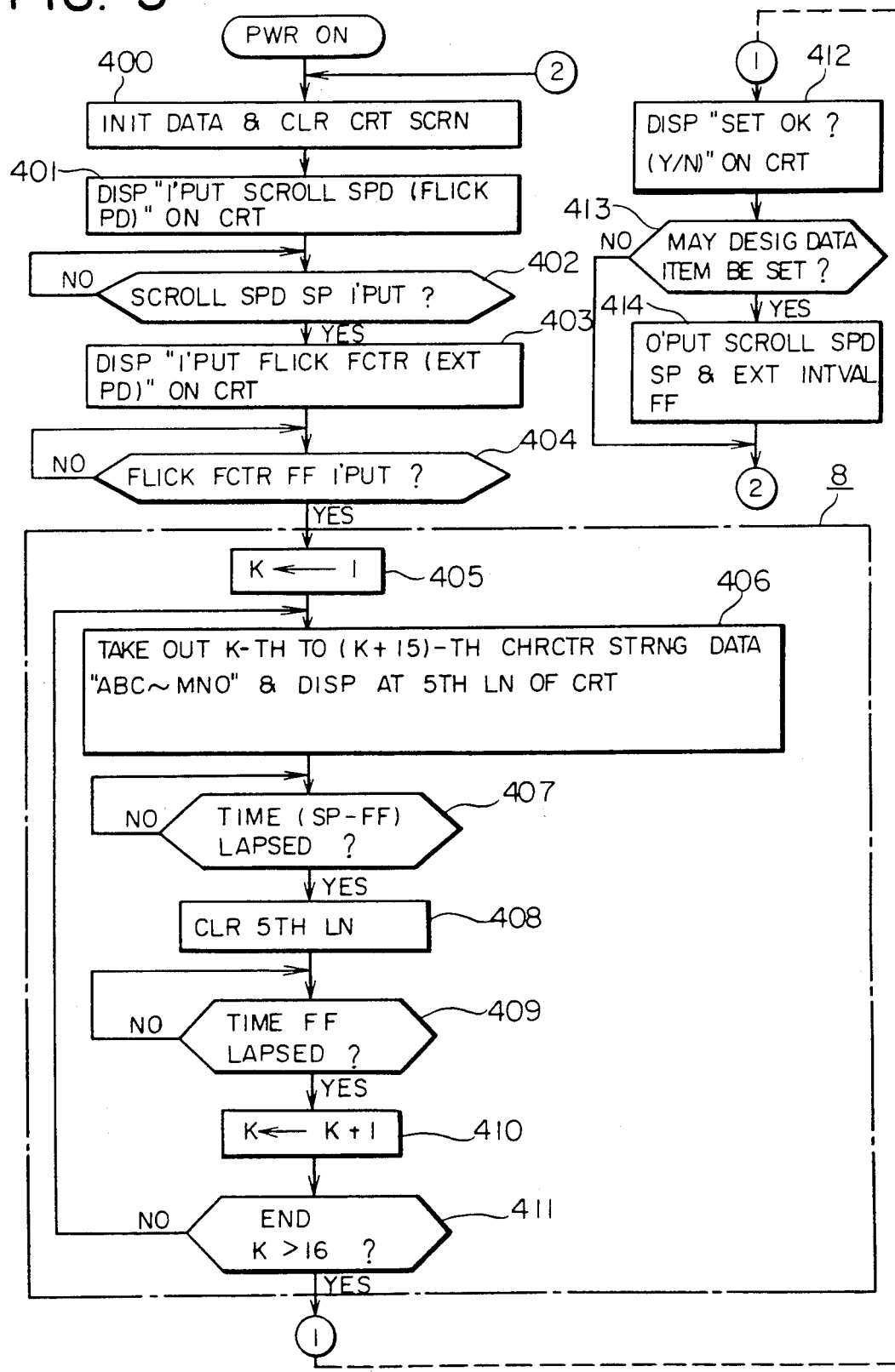
FIG. 3 is a whole flow chart of a display aspect correction device.
Figure 4:
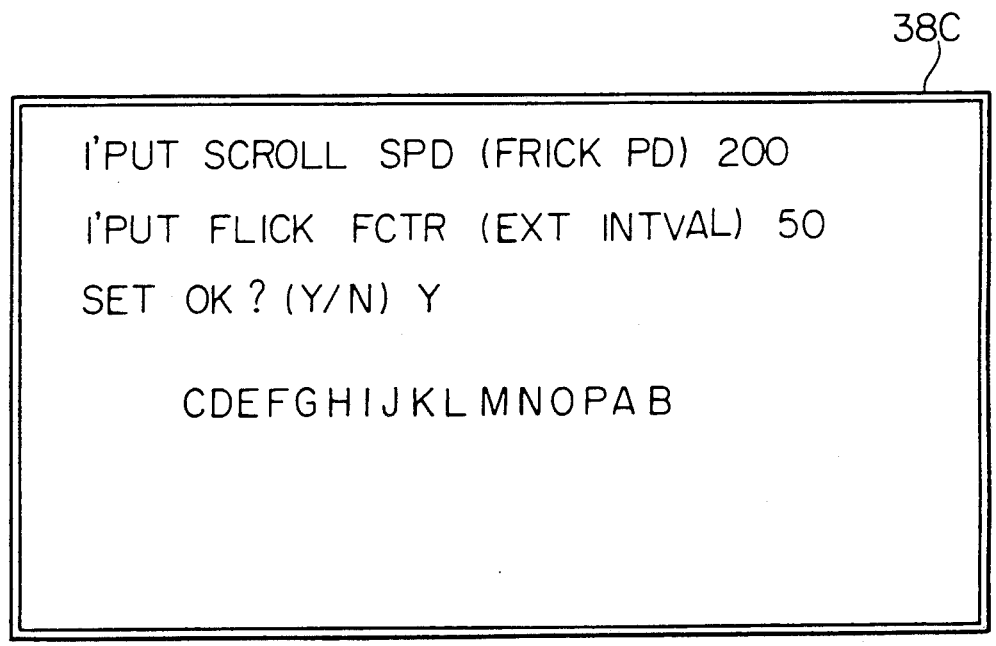
FIG. 4 is a diagram of the display aspect of a CRT.

Referring to FIG. 3, when a power source is first turned "on," a step 400 initializes a data and clears the screen of the CRT 38C. Further, at a step 401, "Input scroll speed (flickering period)." is displayed on the CRT 38C to urge the input, and at a step 402, the input operation of the scroll speed by a caretaker is waited. When the scroll speed is input as "200" (msec) as illustrated in FIG. 4 by way of example, this value is set as scroll speed data SP.

At the next step 403, "Input flickering factor (extinguishment interval)." is displayed on the CRT 38C to urge the input, and at a step 404, the input operation of the extinguishing interval by the caretaker is waited. When the extinguishing interval is input as "50" (msec) as illustrated in FIG. 4 by way of example, this value is set as the extinguishing interval data FF.

Steps 405–411 represent the simulation means 8, which flickers and displays a predetermined character string "ABCDEFGHIJKLMNOP" (16 characters) at the designated speed and flickering period as well as flickering factor on the CRT 38C while scrolling it. At the first step 405, a variable K which expresses a head character to be displayed is initialized to "1". At the next step 406, the K-th to (K+15)-th characters (16-character component) of character string data "ABCDEFGHIJKLMNOP ABCDEFGHIJKLMNO" of 31 characters are taken out, and they are displayed at the fifth line of the CRT 38C as illustrated in FIG. 4 by way of example (for K=3). At the step 407, the character string taken out is kept displayed for a time corresponding to a lighting-up interval (SP - FF) within the flickering period. Thereafter, the fifth line of the CRT 38C is cleared at the step 408, and the lapse of a time corresponding to the extinguishment interval FF within the flickering period if waited at the step 409. Lastly, the variable K is incremented by "1" at the step 410, and the end of the display is decided at the step 411. If the variable K is not greater than at the step 411, the control flow returns to the step 406, at which the head character is shifted to the right by one character, to take out the next character string (16-character component) which is similarly displayed. By repeating these steps, the character string "ABCDE FGHIJKLMNOP" is displayed while flickering and scrolling every character. When the variable K has come to exceed "16," the process of acknowledging the display aspect ends, and the control flow proceeds to a step 412.

At the step 412, "Is setting O.K.? (Y/N)" is displayed on the CRT 38C. At a step 413, the input operation of the caretaker's instruction is waited as to whether or not the designated scroll speed data SP and extinguishment interval data FF may be supplied to the display control device 10. If "Y" is input, the control flow proceeds to a step 414, at which the scroll speed data SP and the extinguishing interval data FF are respectively supplied to the display control device 10 as the scroll speed signal 6a and the extinguishing interval signal 6b, whereupon the control flow returns to the step 400. If "N" is input, the designated scroll speed data SP and extinguishing interval data FF become invalid. Then, the control flow returns to the step 400, and the above processing steps are repeated.

Next, the operation of the display control device 10 for the elevator will be described in accordance with a flow chart in FIG. 5. The operation based on this flow chart is executed by a calculation program which is stored in the ROM 32.

Figure 5:
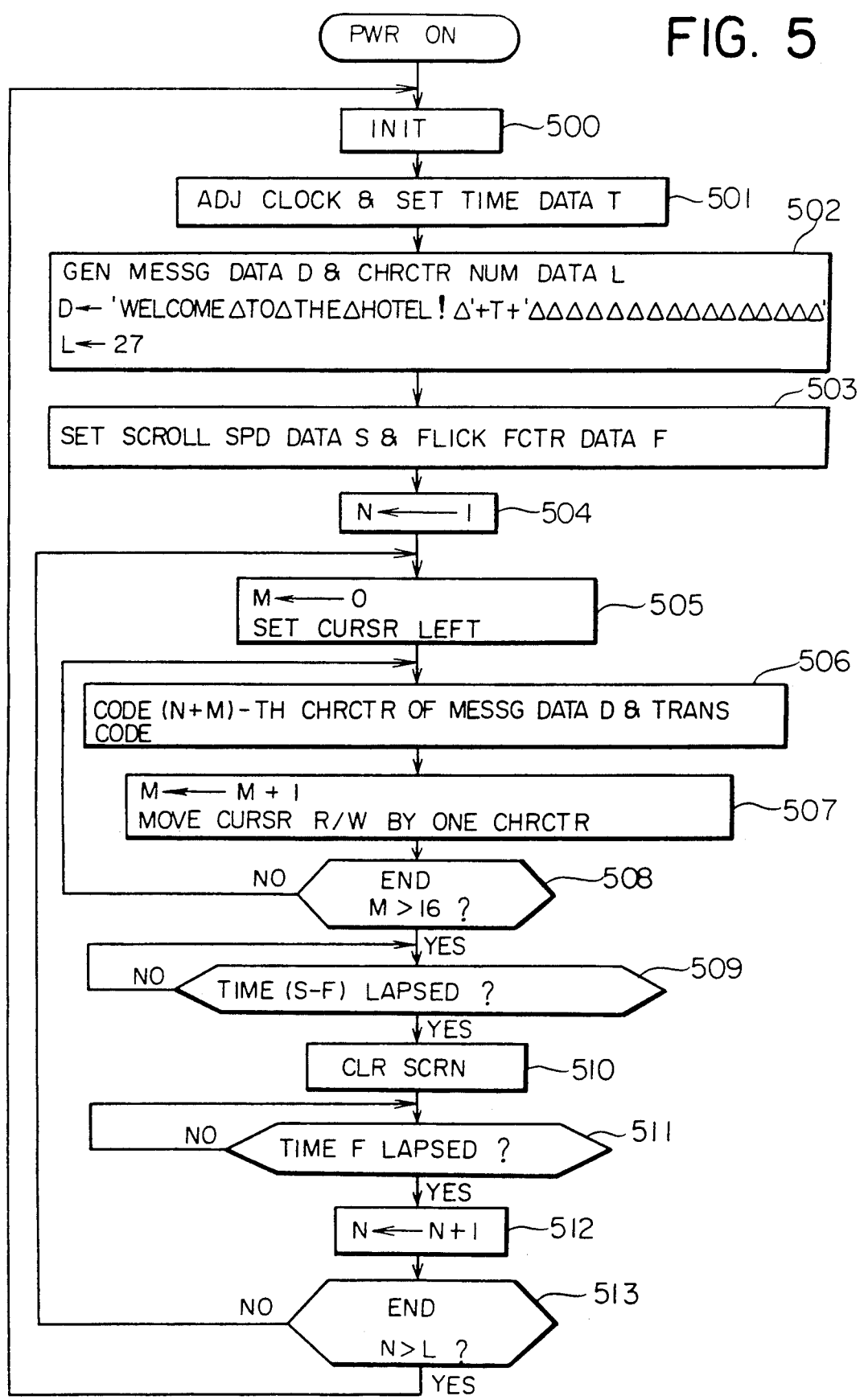
FIG. 5 is a whole flow chart of the display control device.

Referring to FIG. 5, when the power source is first turned "on," the device is initialized at a step 500. At the initializing step 500, data in the RAM 33 is set to predetermined values such as "0," and the clock IC 34 is reset. After the initializing step 500 has ended, the processes of steps 501-513 are repeatedly executed.

At the step 501, set signals are accepted from the clock adjustment switches 37 through the input circuit 35, to adjust the clock IC 34 to a designated time. Besides, the time (o'clock: minutes) is input from the clock IC 34, to set time data T in the RAM 33. At the next step 502, message data D="WELCOMEΔTOΔ-THEΔHOTEL!Δ"+T+"ΔΔΔΔΔΔΔΔΔΔΔΔΔΔΔΔ" (where Δ denotes a blank) and the number of significant characters L="27" of the message data D (the last 16 blanks are added for the sake of convenience in order to establish a construction in which one message is displayed on the screens of the display units 1A and 21A and is thereafter scrolled to disappear from the screens, whereupon the next message begins to be displayed, and they shall not be included in the number of the significant characters of the original message) are set in the RAM 33.

Subsequently, at the step 503, the scroll speed signal 6a and the extinguishing interval signal 6b are input from the display aspect correction device 6 and are set in the RAM 33 as scroll speed data S and extinguishing interval data F, respectively.

At the next steps 504-513, display aspects (the scroll speed, the flickering period and the flickering factor) are determined according to the designated scroll speed data S and extinguishing interval data F, the message data D is so coded that they can be displayed by the display units 1A and 21A, and the codes are delivered to the display units 1A and 21A through the output circuit 36 as the display information signals 36a successively one by one.

Figure 6:
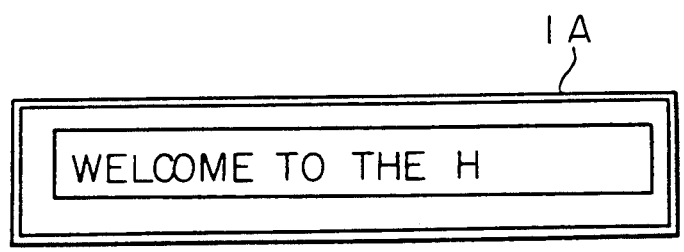
FIG. 6 is a diagram of the aspect of a scroll display on a display unit disposed in a cage.

First, at the step 504, a variable N (set in the RAM 33) which expresses the position of a character to be output within the message data D is initialized to "1." At the step 505, a variable M (set in the RAM 33) which expresses the number of characters having been output is initialized to "0," and the cursor (indicating the position to be displayed in the screen) of each of the display units 1A and 21A is set at the left end of the screen. At the next step 506, the (N+M)-th character as reckoned from the head of the message data D is so coded that it can be displayed by the display units 1A and 21A, and the code is transferred to the display units 1A and 21A through the output circuit 36. At the step 507, the variable M is incremented by "1," and the cursor of each of the display units 1A and 21A is moved rightwards by one character. The step 508 decides if the string of the N-th to (N+M)-th characters (16 characters) as reckoned from the head of the message data D has been entirely output. The processes of the steps 506-508 are repeated until the whole character string is output, that is, until the variable M>16 holds. When the whole string has been output, the control flow proceeds to the step 509. Thus, as illustrated in FIG. 6 by way of example (for the variable N=1), the characters "WEL-COME ΔTOΔTHEΔH" are simultaneously displayed at the left end of the screen of each of the cage display unit 1A and and the hall display unit 21A. At the step 509, the lapse of a time (S−F) corresponding to the lighting-up interval within a flickering period is waited, whereupon the control flow proceeds to the step 510. At this step 510, the screens of the display units 1A and 21A are cleared. The step 511 waits the lapse of a time F corresponding to the extinguishing interval within the flickering period, and is followed by the step 512. At this step 512, the variable N is incremented by "1." Lastly, the step 513 decides if the significant character string of the message data D (L characters from the head) has been entirely output. The processes of the steps 505-513 are repeated until the whole character string is output, that is, until the variable N> the variable L holds. When the whole string has been output, the control flow returns to the step 501.

Thus, the message "WELCOMEΔTOΔTHEΔ-HOTEL!Δ11:05" (for the time data T=11:05) is scroll-displayed while flickering on the screens of the cage display unit 1A and the hall display unit 21A under the conditions of the scroll speed per character=S (msec), the flickering period=S (msec) and the flickering factor=(S−F)/F.

When the whole message has been scrolled, the control flow returns to the step 401 again, and similar processes are repeated.

In this manner, in the embodiment, when the display aspects of a message on a display unit in a cage or a hall are to be corrected by the use of a display aspect correction device, a predetermined message can be simulatively displayed for acknowledgement on a CRT installed on the display aspect correction device, in aspects corresponding to designated display aspects, so that the display aspects as desired can be established without expending labor.

In the embodiment, the display aspects to be corrected have been explained as a speed in the scroll display mode and a flickering period and a flickering factor in the flickering display mode. Needless to say, however, the display aspects to be corrected are not restricted to them, but this invention is applicable also in case of correcting the color, density, background color, size etc. of characters or patterns which constitute the message. Besides, it should be noted that although the scroll direction has been "from the right toward the left" because of the use of the display unit presenting the display of one line, it is not restricted thereto. With a display unit capable of displaying a plurality of lines, the scroll direction can also be readily set at a direction "from the bottom toward the top" by way of example.

In addition, although the display aspect correction device has been explained as being disposed in a caretaker's room in the embodiment, a correction device employing a portable personal computer may well be adopted. With the display aspect correction device of the portable type, after the display aspects are corrected and acknowledged beforehand, the new display aspects can be immediately input by connecting the correction device with a display control device in the cage or hall. This measure is convenient for a building which is not provided with the caretaker's room, and it brings forth the advantage of curtailing expenses for laying signal lines which connect the display control device and the display aspect correction device. Moreover, as the display device for the simulation, the CRT may well be replaced with a small-sized plasma display or a display employing liquid crystal, LED's or the like. In particular, the use of a computer unitary with a display, such as a hand-held computer, in convenient as no installation space is required.

Further, in the embodiment, the scroll rate per character and the flickering period have been set equal. This takes into account that, since characters are scrolled one by one, they become illegible when the scroll rate and the flickering period are unequal. With a system wherein the displayed information is scrolled every unit (dot) constituting the screen of the display unit, such a problem is not involved, and hence, the scroll speed and the flickering period need not always be set equal. It is also easy in that they are permitted to be separately corrected.

Besides, in the embodiment, a very simple character string "ABCEDFGHIJKLMNOP" has been employed as the simulative display information in the aspects corresponding to the display aspects designated for corrections. However, such a meaningless character string may well be replaced with a character string having a meaning such as "GOOD MORNING!" or "11:05 AM" or with the message which is actually displayed in a cage or a hall. With the latter information, the display aspects can be simulated more accurately for acknowledging the legibility.

Although, in the embodiment, the display unit has been a fluorescent display tube capable of simultaneously displaying up to 16 characters, it is not restricted thereto. This invention is readily applied even with a display unit which can simultaneously display 8 characters or 40 characters by way of example. Further, the display display employing liquid crystal, LED's or the like, or a CRT.

Although, in the embodiment, the sorts of display characters usable for messages have consisted of alphabetic letters, numerals and symbols, they are not restricted thereto but may include Chinese characters and "kana" letters (the Japanese syllabary). Even patterns may be regarded as special characters as long as they can be handled equivalently to characters.

As thus far described, this invention adopts a construction in which messages such as the running statuses of an elevator are displayed by a display unit disposed in the cage or hall of the elevator, the messages conforming to control statuses based on the control device of the elevator are controlled by a display control device so as to be displayed in designated display aspects on the display unit, and the designation of the display aspects to the display control device and the simulative display of a message in aspects corresponding to the designated display aspects are performed by a display aspect correction device. The construction brings forth the effect that the alterations of the display aspects as desired and the acknowledgement of the display aspects after the alterations can be readily attained without expending labor.

Next, there will be described a second embodiment wherein when the scroll speed of a display is corrected, flickering display aspects are conjointly corrected.

Figure 7:
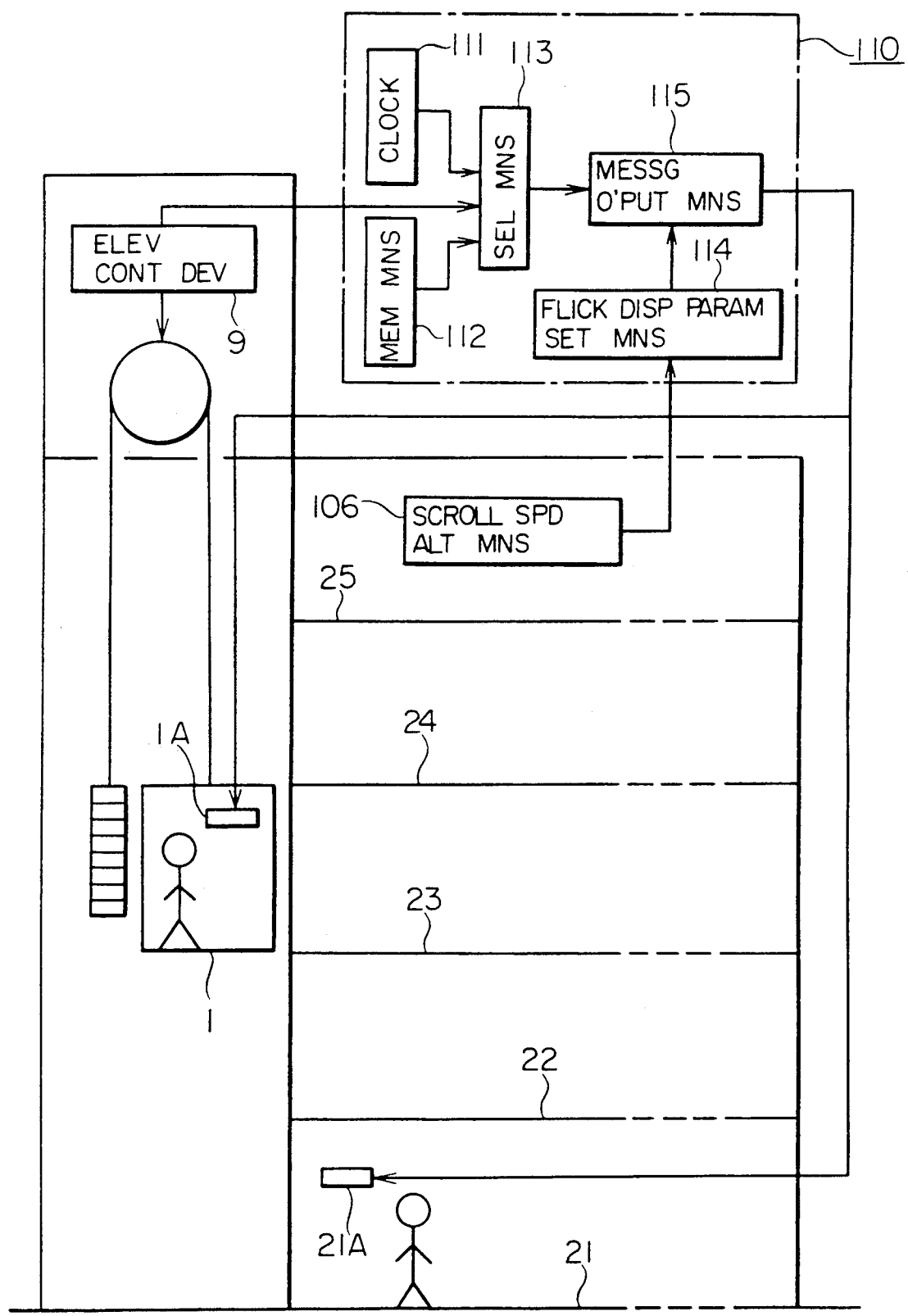

In FIG. 7, portions to which the same symbols as in FIG. 1 are attached indicate identical or corresponding elements, and they shall be omitted from the description.

Numeral 106 indicates scroll speed alteration means constructed of switches for designating the scroll speed of a message which is displayed on display units 1A and 21A. Numeral 110 indicates a display control device for displaying a predetermined message on the display units 1A and 21A. The display control device 110 is constructed of a clock 111 which delivers time information (hour and minutes) expressive of a current time; memory means 112 storing a plurality of items of information to be displayed on the display units 1A and 21A; selection means 113 for selecting and generating the message to-be-displayed displayed from the information of an elevator control device 9, the time information of the clock 111 or/and the information stored in the memory means 112; flickering parameter-setting means 114 for altering a parameter (a flickering period as well as a flickering factor) in order to flickeringly display the message in correspondence with the scroll speed designated by the scroll speed alteration means 106; and message output means 115 for delivering the message to the display unit 1A in a cage 1 and the hall display unit 21A on the first floor 21 in order that the display message may be displayed in predetermined display aspects according to the scroll speed and the flickering parameter.

FIG. 8 is a system block diagram of the display control device 110. Referring to the figure, the display control device 110 is configured of a microcomputer, and it is constructed of a CPU 131, a ROM 132, a RAM 133, a clock IC 134, an input circuit 135 and an output circuit 136. Numeral 137 indicates adjustment switches for adjusting the clock IC 134. A signal 136a which is delivered from the output circuit 136 is a coded display information signal which expresses the message to be displayed on the cage display unit 1A and the hall display unit 21A of the first floor. Shown at numeral 138 are scroll speed selection switches corresponding to the scroll speed alteration means 106 in FIG. 7. A switch signal 138a corresponds to a scroll rate per character of the message, and expresses a scroll speed number (=1−5).

FIG. 9 shows data stored in the ROM 132 of the display control device 110. S(1)–S(5) denote scroll speed data items which correspond to the values (=1−5) of the scroll speed No. signals 138a, and which express the scroll rates per character of the message in milliseconds (hereinbelow, written as "msec"). F(1)–F(5) denote extinguishing interval data items which also correspond to the values (=1−5) of the scroll speed No. signal 138a, and which express extinguishing intervals within the flickering period of the message in "msec."

Next, the operation of the display control device 110 for the elevator will be described in accordance with a flow chart in FIG. 10. The operation based on this flow chart is executed by a calculation program which is stored in the ROM 132.

Figure 10:
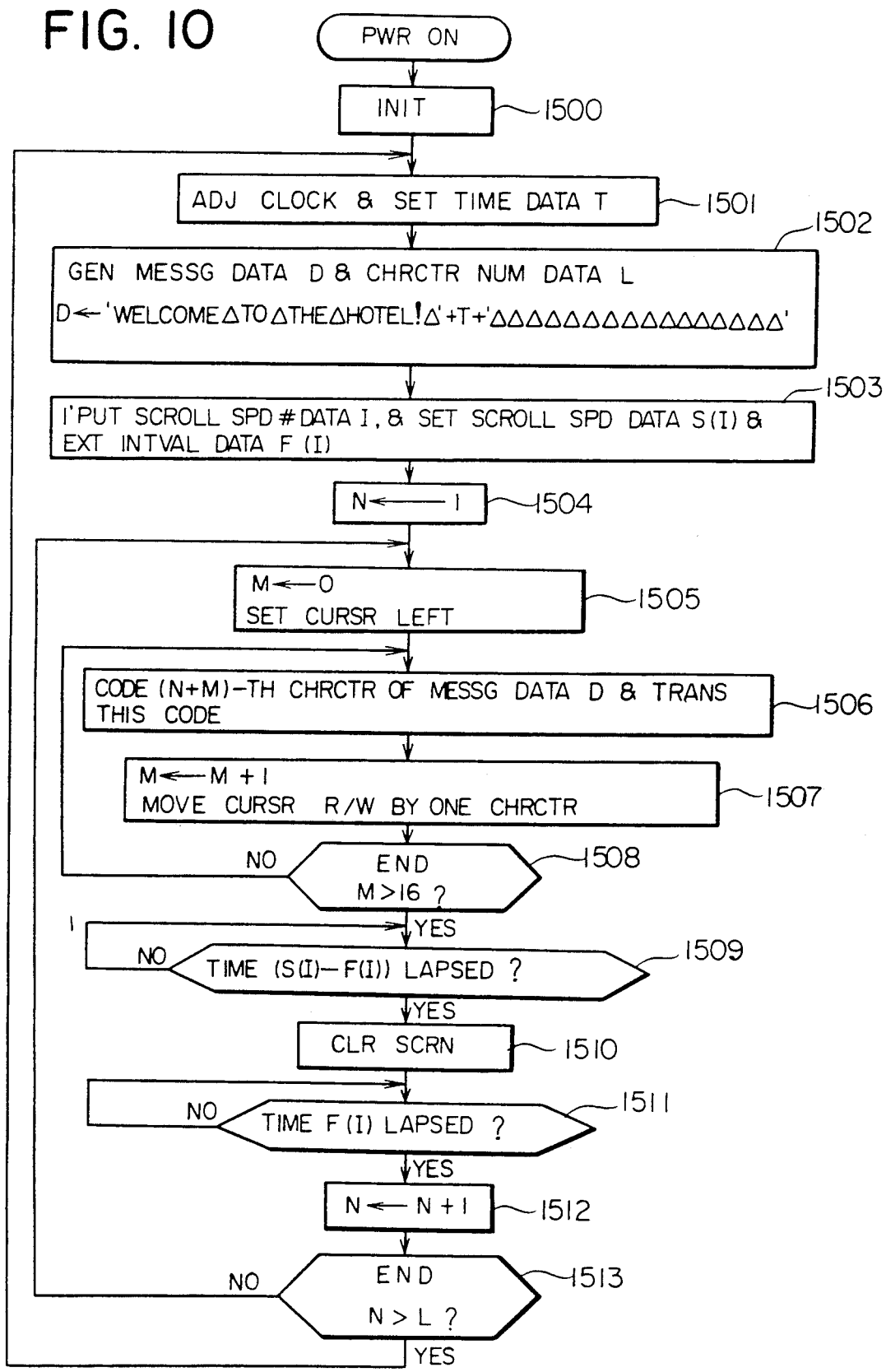

Referring to FIG. 10, when a power source is first turned "on," the device is initialized at a step 1500. At the initializing step 1500, data in the RAM 133 is set to predetermined values such as "0," and the clock IC 134 is reset. After the initializing step 1500 has ended, the processes of steps 1501–1513 are repeatedly executed.

At the step 1501, set signals are accepted from the clock adjustment switches 137 through the input circuit 135, to adjust the clock IC 134 to a designated time. Besides, the time (o'clock minutes) is input from the clock IC 134, to set time data T in the RAM 133. At the next step 1502, message data D="WELCOMEΔTOΔTHEΔHOTEL!Δ"+T+"ΔΔΔΔΔΔΔΔΔΔΔΔΔΔΔΔ" (where Δ denotes a blank) and the number of significant characters L="27" of the message data D (the last 16 blanks are added for the sake of convenience in order to establish a construction in which one message is displayed on the screens of the display units 1A and 21A and is thereafter scrolled to disappear from the screens, whereupon the next message begins to be displayed, and they shall not be included in the number of the significant characters of the original message) are set in the RAM 133.

Subsequently, at the step 1503, the scroll speed No. signal 138a is input from the scroll speed selection switches 138 and is set in the RAM 133 as No. data I, and besides, the scroll speed data S(I) and the extinguishing interval data F(I) are set in the RAM 133.

At the next steps 1504–1513, display aspects (the scroll speed, the flickering period and the flickering factor) are determined according to the designated scroll speed data S(I) and extinguishing interval data F(I), the message data D is so coded that they can be displayed by the display units 1A and 21A, and the codes are delivered to the display units 1A and 21A through the output circuit 136 as the display information signals 136a successively one by one.

First, at the step 1504, a variable N (set in the RAM 133) which expresses the position of a character to be output within the message data D is initialized to "1." At the step 1505, a variable M (set in the RAM 133) which expresses the number of characters having been output is initialized to "0," and the cursor (indicating the position to be displayed in the screen) of each of the display units 1A and 21A is set at the left end of the screen. At the next step 1506, the (N+M)-th character as reckoned from the head of the message data D is so coded that it can be displayed by the display units 1A and 21A, and the code is transferred to the display units 1A and 21A through the output circuit 136. At the step 1507, the variable M is incremented by "1," and the cursor of each of the display units 1A and 21A is moved rightwards by one character. The step 1508 decides if the string of the N-th to (N+M)-th characters (16 characters) as reckoned from the head of the message data D has been entirely output. The processes of the steps 1506–1508 are repeated until the whole character string is output, that is, until the variable M>16 holds. When the whole string has been output, the control flow proceeds to the step 1509. Thus, as illustrated in FIG. 11 by way of example (for the variable N=1), the characters "WELCOME TOΔTHEΔH" are simultaneously displayed at the left end of the screen of each of the display units 1A and 21A. The step 1509, waits for the lapse of a time (S(I)-F(I)), corresponding to the lighting-up interval within the flickering period, whereupon the control flow proceeds to the step 1510. At this step 1510, the screens of the display units 1A and 21A are cleared. The step 1511 waits for the lapse of a time F(I) corresponding to the extinguishing interval within the flickering period, and is followed by the step 1512. At this step 1512, the variable N is incremented by "1". Lastly, the step 1513 decides if the significant character string of the message data D (L characters from the head) has been entirely output. The processes of the steps 1505–1503 are repeated until the whole character string is output, that is, until the variable N> the variable L holds. When the whole string has been output, the control flow returns to the step 1501.

Thus, the message "WELCOMEΔTOΔTHEΔHOTEL!Δ11:05" (for the time data T=11:05) is scroll-displayed while flickering on the screens of the display units 1A and 21A under the conditions of the scroll speed per character =S(I) (msec), the flickering period =S(I) (msec) and the flickering factor =(S(I)-F(I))/F(I).

When the whole message has been scrolled, the control flow returns to the step 1501 again, and similar processes are repeated.

In this manner, in the embodiment, when the scroll speed of a message on a display unit in a cage or a hall is to be corrected by the use of scroll speed selection switches, the flickering aspect (flickering period and/or flickering factor) of a flickering display is also altered in conformity with the designated scroll speed, so that the message can be rendered legible even when both a scroll display and the flickering display are employed.

In the embodiment, the scroll rate per character and the flickering period have been set equal. This takes into account that, since characters are scrolled one by one, they become illegible when the scroll rate and the flickering period are unequal. With a system wherein the displayed information is scrolled every unit (dot) constituting the screen of the display unit, such a problem is not involved, and hence, the scroll speed and the flickering period need not always be equal. In this regard, likewise to the extinguishment interval data items F(I), flickering period data items may be set in the ROM 132 in correspondence with the scroll speeds.

Although, in the embodiment, a flickering parameter has been a flickering period as well as an extinguishing interval, it is not restricted thereto. It is also possible to employ the combination between the flickering period and a lighting-up interval, only the flickering period, or only the flickering factor as the parameter. Besides, although in the embodiment the display (lighting-up) and extinguishing of a character portion have been alternately performed as the flickering display, this invention can of course be directly applied to a flickering display system wherein the extinguishing of the whole character is replaced with the use of a black-and-white reversal character (with which, by way of example, a background area is lit up when the character portion is extinguished).

Although, in the embodiment, the display unit has been a fluorescent display tube capable of simultaneously displaying up to 16 characters, it is not restricted thereto. This invention is readily applied even with a display unit which can simultaneously display 8 characters or 40 characters. Further, the display unit may well be a plasma display, a character or graphic display employing a liquid crystal, LED's or the like, or a CRT.

Further, although the sorts of display characters usable for messages have consisted of alphabetic letters, numerals and symbols in the embodiment, they are not restricted thereto but may include Chinese characters and "kana" letters (the Japanese syllabary). Even patterns may be regarded as special characters as long as they can be handled equivalently to characters.

As thus far described, the second embodiment of this invention consists in a display apparatus for an elevator having a display unit which is disposed in the cage or hall of the elevator and which can simultaneously display a limited number of characters not greater than a prescribed value, storage means for storing a plurality of items of information which are to be displayed on the display unit, selection means for selecting and generating the information stored in the storage means when predetermined conditions have held, and output means for converting the generated information into a character string and for scrollingly displaying the character string at a designated speed on the display unit and also flickeringly displaying the whole or part of the character string in accordance with a parameter determining a display aspect, characterized by a construction in which the scroll speed is altered by scroll speed alteration means, and the parameter is simultaneously altered in correspondence with the scroll speed by flickering parameter-setting means. Therefore, even when the scroll speed has been altered by the correction device, a message to be flickeringly displayed can be made legible.

Next, there will be described a third embodiment concerning a display apparatus in which it is easy to edit the displayed information and the arrangement of which does not become complicated as a whole.

Figure 12:
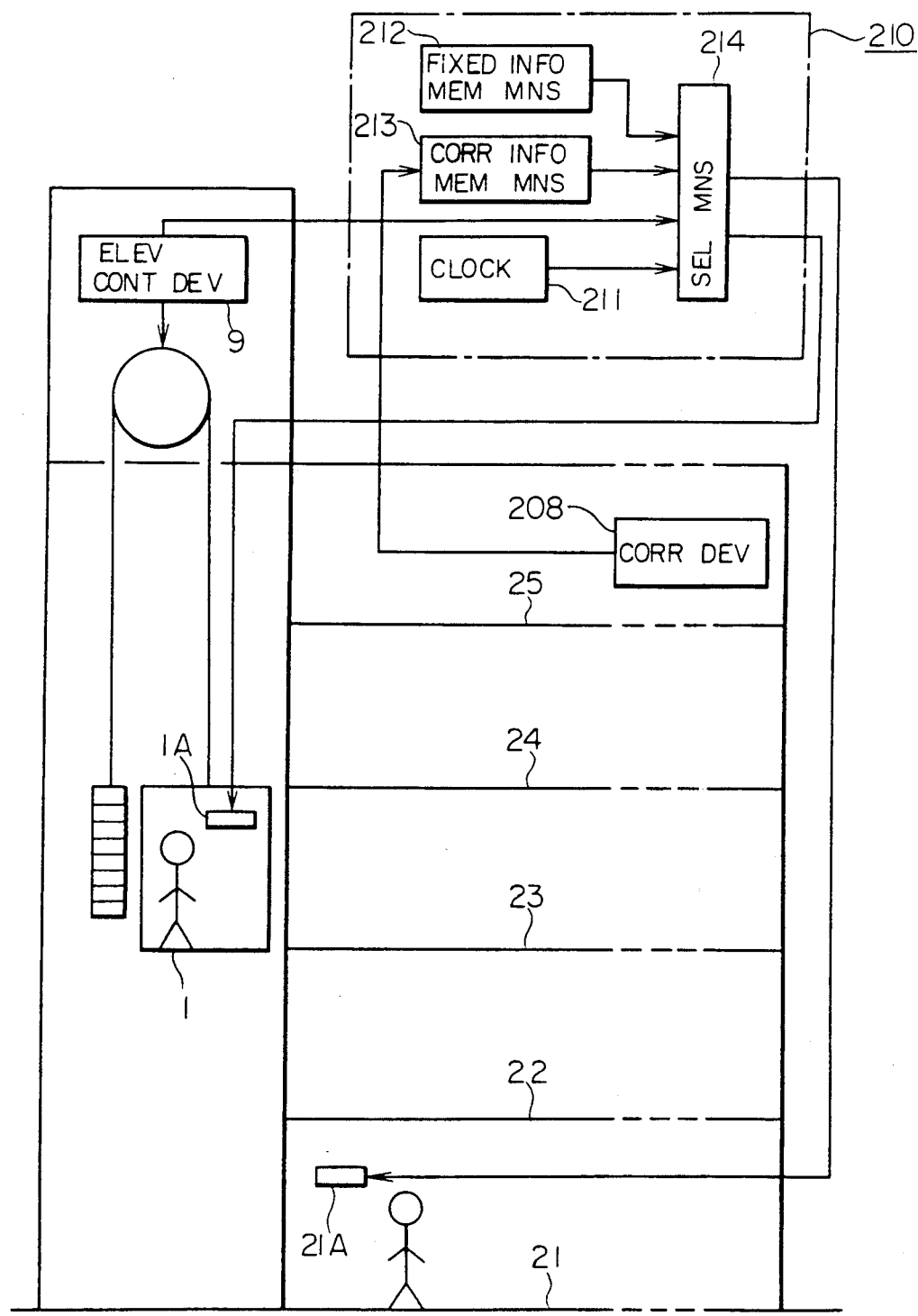
FIG. 12 is a general arrangement diagram of a display apparatus for an elevator according to a third embodiment of this invention.

In FIG. 12, portions to which the same symbols as in FIG. 1 are attached indicate identical or corresponding elements, and they shall be omitted from the description.

Numeral 208 indicates a correction device which is disposed in the caretaker's room of a building, and which is constructed of a personal computer, a keyboard and a CRT. Numeral 210 indicates a display control device.

With the correction device 208, even a person who is not an elevator expert can easily correct the contents of the displayed information (a message) and a display aspect merely by manipulating the keyboard in accordance with instructions displayed on the CRT.

The display control device 210 is constructed of a clock 211 which delivers time information (hour and minutes) expressive of a current time; fixed information memory means 212 for fixedly storing information items to be displayed on display units 1A and 21A in correspondence with display commands from an elevator control device 9, correction information memory means 213 for storing information items corrected in correspondence with the fixed information items by the manipulation of the correction device 208; and selection means 214 operating when the correction information corresponding to the display command from the elevator control device 9 is not stored in the correction information memory means 213, to select the fixed information corresponding thereto from the fixed information memory means 213, and operating when the correction information corresponding to the display command is stored in the correction information memory means 213, to select the correction information, the selected information being delivered to the display unit 1A in a cage 1 and the hall display unit 21A on the first floor 21.

Figure 13:
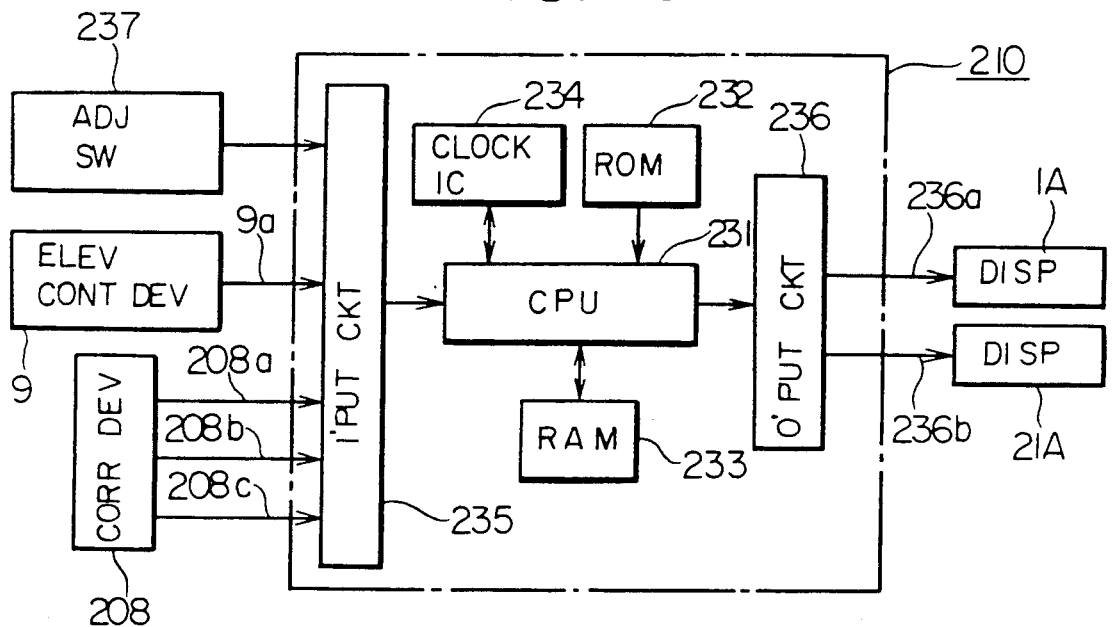
FIG. 13 is a system block diagram of a display control device in FIG. 12.

FIG. 13 is a system block diagram of the display control device 210 which is materialized using a microcomputer. Referring to the figure, the display control device 210 is constructed of a CPU 231, a ROM 232, a RAM 233, a clock IC 234, an input circuit 235 and an output circuit 236. A display command signal 9a which is delivered from the elevator control device 9 is coded, and assumes any of values "0"-"3". The value "0" indicates that the display command from the elevator control device 9 is invalid, and the values "1"-"3" indicate that displays at the occurrence of an earthquake, at the occurrence of a fire and at the detection of an overload are commanded, respectively. Symbols 208a-208c denote correction information signals which are provided from the correction device 208. The signal 208a is a message No. signal which expresses No. (any of 1—3) of information to be corrected, and which corresponds to any of code Nos. "1"-"3" of the display command signal 9a. When the message No. signal 208a is "0", it is indicated that correction information to be applied as an input is invalid. The signal 208b is a coded display character string signal which indicates a message in the information to-be-corrected, while the signal 208c is a scroll speed signal which indicates a scroll speed as being one of the display aspects in the information to-be-corrected and which expresses the speed per character in msec. Signals 236a and 236b which are delivered from the output circuit 236 are coded display information signals which express messages to be displayed on the cage display unit 1A and the hall display unit 21A of the first floor, respectively. Numeral 237 denotes switches for adjusting the clock IC 234.

FIG. 14 is a diagram which indicates the contents of the plurality of information items stored in the ROM 232. Stored here are coded fixed message data items MS(1), MS(2) and MS(3) which express "EARTHQUAKE EMERGENCY! PLEASE GET OFF WHEN DOORS OPEN.," "FIRE EMERGENCY! PLEASE GET OFF WHEN DOORS OPEN" and "OVERLOAD! SOMEONE PLEASE STEP OUT" respectively, character number data items LS(1), LS(2) and LS(3) which express the number of characters (including also blanks), "53," "47" and "34" of these respective messages, and fixed scroll speeds SS(1), SS(2) and SS(3) which express scroll speeds "100," "100" and "150 " for displaying these respective messages.

FIG. 15 is a diagram which indicates the sorts of the data stored in the RAM 233. The RAM 233 stores therein coded correction message data items MM(1), MM(2) and MM(3) which correspond to the fixed message data items MS(1), MS(2) and MS(3) respectively;

correction character number data items LM(1), LM(2) and LM(3) which express the numbers of characters of the correction message data items MM(1), MM(2) and MM(3) respectively; correction scroll speed data items SM(1), SM(2) and SM(3) which correspond to the fixed scroll speeds SS(1), SS(2) and SS(3) respectively; a message data item DA which is to be displayed on the cage display unit 1A; a message data item DB which is to be displayed on the hall display unit 21A; a character number data item LA which expresses the number of characters of the message data DA; a character number data item LB which expresses the number of characters of the message data DB; a scroll speed data item SA which expresses the speed of the scroll display of the message data DA; a message No. data item I which corresponds to the message No. signal 208a; a display command data item J which corresponds to the display command signal 9a; a time data item T which expresses a current time (o'clock: minutes); and a variable K which expresses the position of a character to be output within each of the message data items DA and DB.

Next, the operations of the display control device 210 will be described in accordance with flow charts shown in FIGS. 16-18. The operations based on the flow charts are executed by calculation programs stored in the ROM 232.

Figure 16:
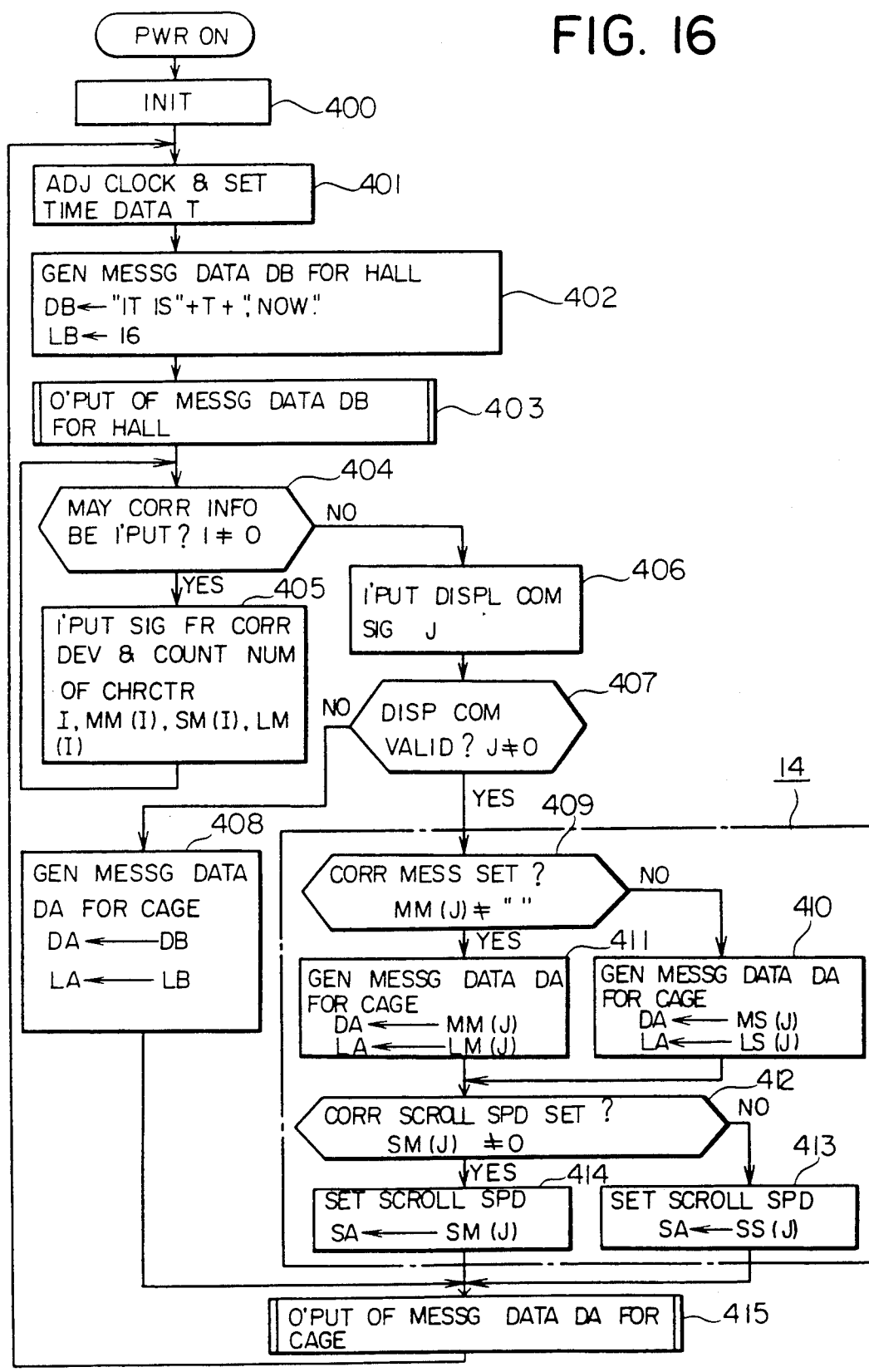
FIG. 16 is a whole flow chart of the display control device.

Referring to FIG. 16, when a power source is first turned "on" the device is initialized at a step 400. At the initializing step 400, among the data items in the RAM 233, the correction message data items MM(1), MM(2) and MM(3) are respectively set at character strings of length "0" (=null strings), the correction character number data items LM(1), LM(2) and LM(3) are respectively set at "0," and the correction scroll speeds SM(1), SM(2) and SM(3) are respectively set at "0," and the clock IC 234 is reset. After the initializing step 400 has ended, the processes of steps 401-415 are repeatedly executed.

At the step 401, set signals are accepted from the clock adjustment switches 237 through the input circuit 235, to adjust the clock IC 234 to a designated time. Besides, the current time (o'clock: minutes) is accepted from the clock IC 234, to set the time data T. At the next step 402, the message data DB for the hall display unit 21A is generated on the basis of the time data T. Assuming by way of example that the time data be T=11:00, the message data is generated as DB="IT IS 11:00, NOW." At the same time, the character number data LB is set as "16." At the step 403, the generated message data DB is transferred through the output circuit 236 so as to be displayed on the hall display unit 21A. This step 403 will be detailed with reference to the flow chart of FIG. 17.

Figure 17:
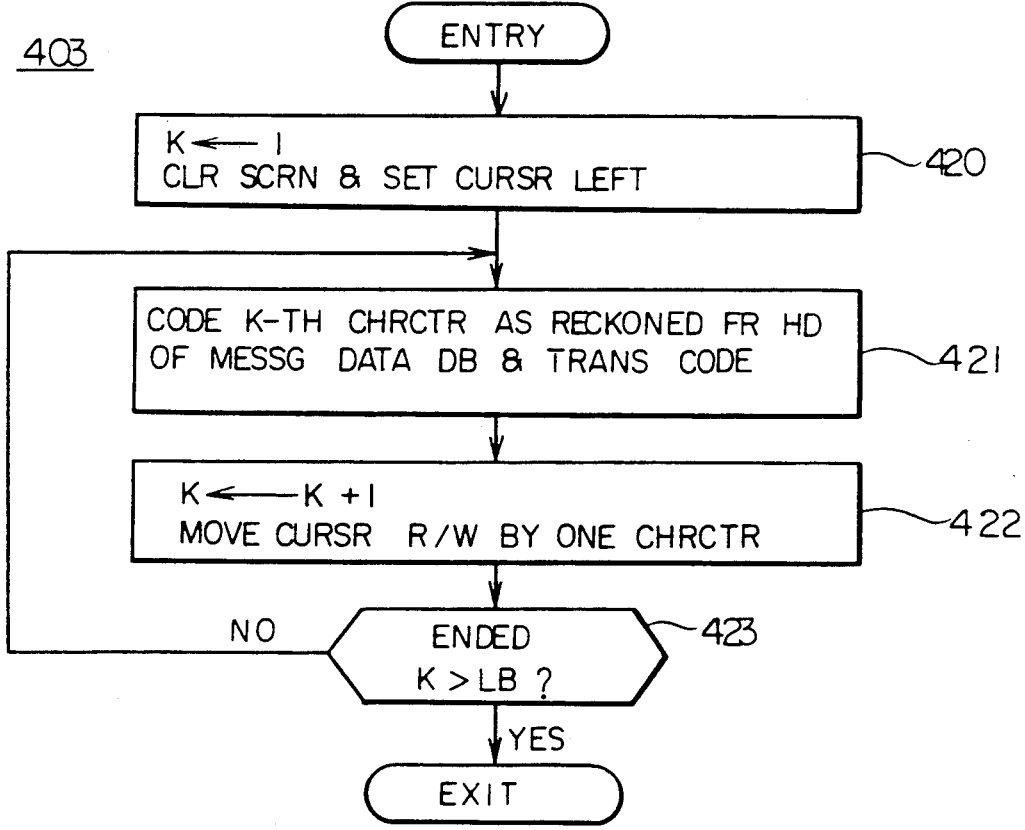
FIG. 17 is a detailed flow chart flow of a step 403 in FIG. 16.
Figure 19:
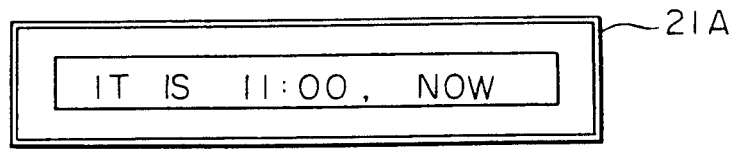

At a step 420 in FIG. 17, the variable K which expresses the position of a character to be output within the message data DB is initialized to "1," the screen of the hall display unit 21A is cleared and a cursor (indicating a position to be displayed in the screen) is set at the left end of the screen. At a step 421, the K-th character as reckoned from the head of the message data DB is so coded that it can be displayed by the hall display unit 21A, and the code is transferred to the display unit 21A through the output circuit 236 as the display information signal 236b. At a step 422, the variable K is incremented by "1," and the cursor of the hall display unit 21A is moved rightwards by one character. A step 423 decides if the message data DB has been entirely output. The processes of the steps 421-423 are repeated until all characters constituting the message data DB are output, that is, until the variable K > the character number LB holds. When all the characters have been output, the process of the step 403 ends. Thus, as illustrated in FIG. 19 by way of example, the message "IT IS 11:00, NOW." is simultaneously displayed at the left end part of the screen of the display unit 21A.

Subsequently, at the step 404, the message No. signal 208a is received as the message No. data I, to decide whether or not the other correction information signals 208b and 208c may be input. If the message No. data I has any value other than "0," the step 405 receives the correction character string signal 208b as the correction message data MM(1), receives the scroll speed signal 208c as the correction scroll speed data SM(I) and counts the number of characters of the correction message data MM(I) to set the correction character number data LM(I). Thereafter, the control flow returns to the step 404 again. When the corrected message and scroll speed have been entirely transferred from the correction device 208 to the display control device 210, the message No. data I becomes "0." This status is detected by the step 404, which is now followed by the step 406.

At the step 406, the display command signal 9a is received and is set as the display command data J. Then, a message to be displayed on the cage display unit 1A and a display aspect therefor are selected on the basis of the display command data J at the steps 407-414.

The step 407 decides whether the display command data J is valid or invalid. If the display command data J is "0," the control flow proceeds to the step 408, at which the message data DA for the cage and the display character number data LA are respectively set equal to the message data DB for the hall and the display character number data LB.

On the other hand, if the step 407 decides the display command data J to be any value other than "0," the control flow proceeds to the step 409, which decides whether or not the correction message data MM(J) corresponding to the display command data J is set. If the correction message data MM(J) is the character string of length "0" (=the null string), the fixed message data MS(J) and the fixed display character number data LS(J) are respectively set as the message data DA for the cage and the display character number data LA at the step 410. On the other hand, if the correction message data MM(J) is any character string other than the character string of length "0," for example, if it is the correction message data MM(1), "EARTHQUAKE EMERGENCY! PLEASE WAIT A MINUTE AND GET OFF." on the basis of the display command data J of "1," then the correction message data MM(J) and the correction display character number data LM(J) (="55") are respectively set as the message data DA for the cage and the display character number data LA at the step 411.

The next step 412 decides whether or not the correction scroll speed data SM(J) corresponding to the display command data J is set. If the correction scroll speed data SM(J) is "0," the fixed scroll speed data SS(J) is set as the scroll speed data SA at the step 413. On the other hand, if the correction scroll speed data SM(J) has any value other than "0," for example, if it is the correction scroll speed data SM(1), "200" on the basis of the display command data J of "1", then correction scroll speed data SM(J) (="200") is set as the scroll speed data SA at the step 414.

When the message to be displayed on the cage display unit 1A and the display aspect thereof have been selected, the step 415 transfers the selected message data DA through the output circuit 36 so as to display it in the selected display aspect on the cage display unit 1A. This step 415 will be detailed with reference to the flow chart of FIG. 18.

Figure 18:
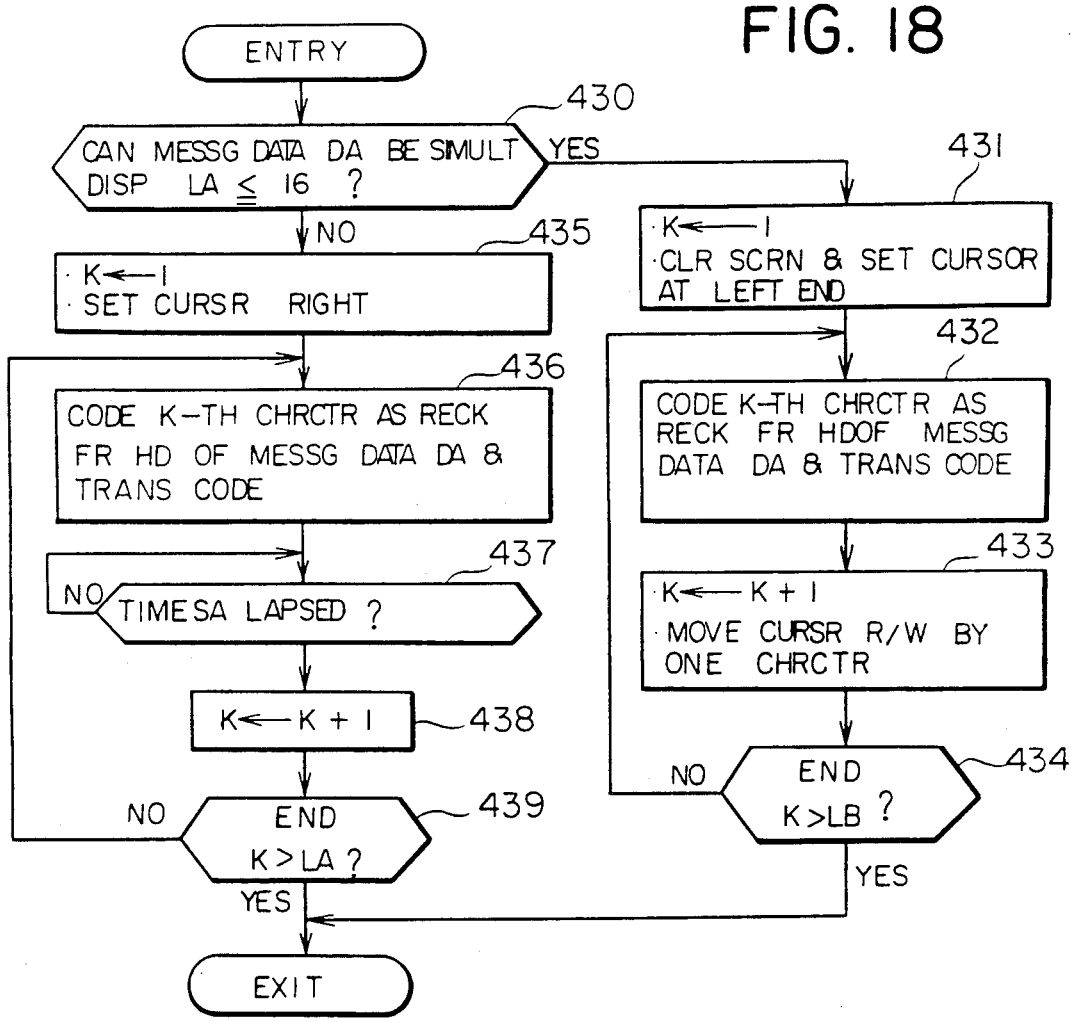
FIG. 18 is a detailed chart of a step 415 in FIG. 16, and FIGS. 19 and 20 are diagrams each showing a display example of a scroll display on a display unit.

The first step 430 in FIG. 18 decides whether or not the message DA can be simultaneously displayed. As stated before, the number of characters which the cage display unit 1A can simultaneously display is up to 16. If the display command data J is "0" and the time data T is T=11:00 by way of example, the message data becomes DA="IT IS 11:00, NOW." (the number of characters LA=16), and hence, the control flow proceeds to a step 431. At steps 431-434, likewise to the processes of the steps 420-423 in FIG. 17, the selected message data DA is transferred as the display information signal 236a through the output circuit 236 and is displayed on the cage display unit 1A. In this way, when no display command is given from the elevator control device 9, the current time is displayed on the cage display unit 1A.

Figure 20:
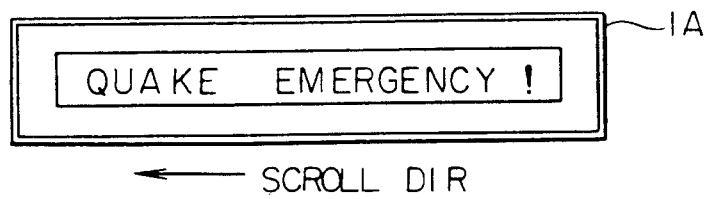

If, at the step 430, the display command data J is "1" and the message data DA is "EARTHQUAKE EMERGENCY! PLEASE GET OFF WHEN DOORS OPEN." (the number of characters LA=53), then the control flow proceeds to a step 435 this time. At steps 435-439, the message data DA is so coded that it can be displayed in conformity with the set scroll speed data SA by the cage display unit 1A, and the codes are transferred to the cage display unit 1A through the output circuit 236 successively one by one and at time intervals corresponding to the scroll speed data SA. First, at the step 435, the variable K which expresses the position of a character to be output within the message data DA is initialized to "1," and the cursor of the cage display unit 1A is set at the right end of the screen. At the step 436, the K-th character as reckoned from the head of the message data DA is so coded that it can be displayed by the cage display unit 1A, and the code is transferred to the cage display unit 1A through the output circuit 236. At the step 437, the lapse of a time corresponding to the scroll speed data SA is waited, whereupon the control flow proceeds to the step 438. This step 438 increments the variable K by "1." The cage display unit 1A is so constructed that when the coded character signal is input with the cursor located at the right end, a character string being displayed on the screen is shifted leftwards by one character, to discard one character at the left end, and to add one character having entered the right side of the screen, whereby the scroll display is presented. The step 439 decides whether or not the message data DA has been entirely output. The processes of the steps 436-439 are repeated until all characters constituting the message data DA are output, that is, until the variable K> the number of characters LA holds. When all the characters have been output, the process of the step 415 ends. In this way, when the display command is given from the elevator control device 9, the message corresponding to the cage display unit 1A is scroll-displayed at the designated speed in accordance with the display command. As shown in FIG. 20 by way of example, the message data DA is displayed on the cage display unit 1A while scrolling one character from the right toward the left every time interval corresponding to the scroll speed data SA.

In this fashion, at the step 415, the message data DA is output to the cage display unit 1A.

When the message data DA has been entirely transferred, the control flow returns to the step 401 again, and similar processes are repeated.

In this manner, in the embodiment, when correction information items (a message and a scroll speed) corresponding to a display command from an elevator control device are not set in a RAM by a correction device, fixed information items corresponding thereto are selected from a ROM, and when the correction information items corresponding to the display command are stored in the RAM, they are selected, and the selected information items are displayed on a cage display unit. Therefore, even when it has become necessary to alter the message and the scroll speed after the start of the operation of an elevator, a person who is not an elevator expert can readily alter them by the use of the correction device of simple manipulation, and nevertheless, the cost of the whole system is not raised. Further, even in case of restoring the display to the original information again after the correction, the standard information remains in the ROM, and hence, there is the advantage that the correction information may merely be erased without expending labor.

In the embodiment, the messages at the occurrence of an earthquake, at the occurrence of a fire and at the detection of an overload have been respectively displayed according to the display commands from the elevator control device, but the way of issuing display commands is not restricted thereto. Needless to say, this invention is applicable to any messages based on the operation of the elevator, for example, messages at the occurrence of power failure, at the detection of a fault or abnormality, and the forcible closure of a door.

Besides, although the embodiment has been described as normally displaying the time on a hall display unit, this invention is also applicable to a system wherein a display stating to the effect that the elevator cannot be used is presented at, for example, the detection of a fault or abnormality or the occurrence of a fire in accordance with a display command from the elevator control device, also in a hall as in a cage.

Further, although the embodiment has employed the ROM as means for storing the fixed information items, any storage medium may well be used as long as it is a storage medium capable of retaining stored contents without a power source, such as a floppy disk or an optical disk. Moreover, although the RAM has been employed as means for storing the correction information items, it may well be replaced with another accessible storage medium (for example, a flexible magnetic disk).

As thus far described, the third embodiment of this invention is so constructed that preset items of fixed information are stored in storage means, that correction information items applied from a correction device are stored in another storage means in a manner to respectively correspond to the fixed information items, that when correction information corresponding to a display command from an elevator control device is not stored in the second-mentioned storage means, the fixed information corresponding thereto is selected from the first-mentioned storage means by selection means for selecting a plurality of items of information of the first-mentioned storage means, while when the correction information corresponding to the display command is stored in the second-mentioned storage means, the stored correction information is selected, and that the selected information is displayed on a display unit which is disposed in the cage or hall of the elevator. Therefore, both the fixed information and the correction information can be selectively displayed on the display unit. This brings forth the effect that, even when it has become necessary to partly alter a message or a display aspect after the start of the operation of the elevator, the correction can be readily made without raising the cost of the whole system.

Next, there will be described a fourth embodiment wherein untimely information, attributed to the fact that a dispaly content has not been updated, is prevented from being displayed.

Figure 21:
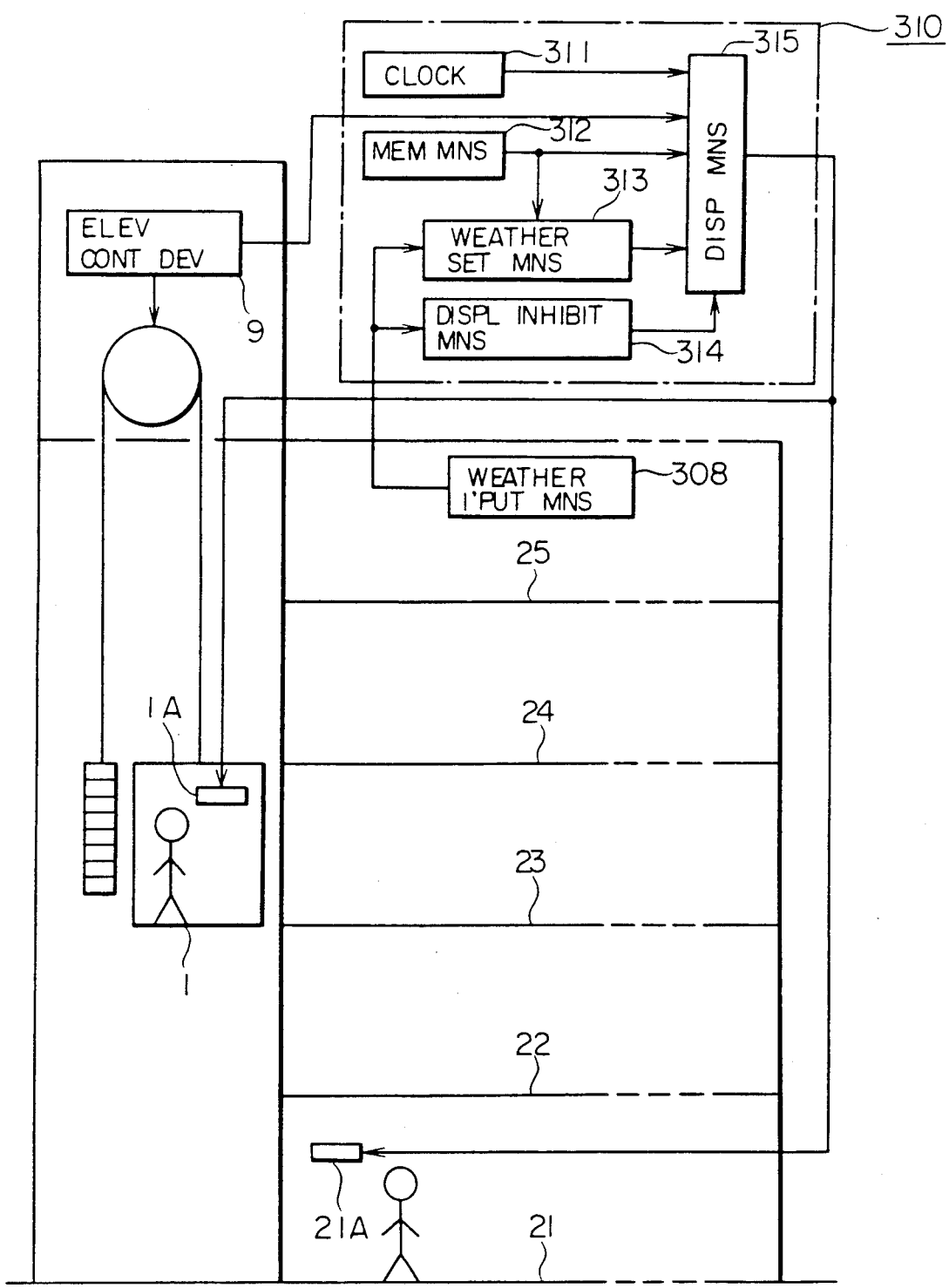

In FIG. 21, portions to which the same symbols as in FIG. 1 are attached indicate identical or corresponding elements, and they shall be omitted from the description.

Numeral 308 indicates weather input means constructed of switches for designating the weather condition of a weather forecast which is displayed on display units 1A and 21A. Numeral 310 indicates a display control device for displaying a predetermined message on the display units 1A and 21A. The display control device 310 is constructed of a clock 311 which delivers time information (hour and minutes) expressive of a current time; memory means 312 for storing a plurality of items of information to be displayed on the display units 1A and 21A; weather setting means 313 for setting the message of the weather forecast to-be-displayed on the basis of the information items designated by the weather input means 308 and stored in the memory means 312; display inhibition means 314 for issuing a command for inhibiting the display of the weather forecast, upon detecting that the weather condition has not been designated by the weather input means 308 within a preset interval; and display means 315 for selecting and generating the message to-be-displayed on the basis of the time information, the information stored in the memory means 312, and the information set by the weather setting means 313, and for delivering the message to-be-displayed to the display unit 1A in a cage 1 and the hall display unit 21A on the first floor 21; this display means 315 operating particularly when the inhibit command is provided from the display inhibition means 314, to generate the message to-be-displayed by deleting a message relevant to the weather forecast.

Figure 22:
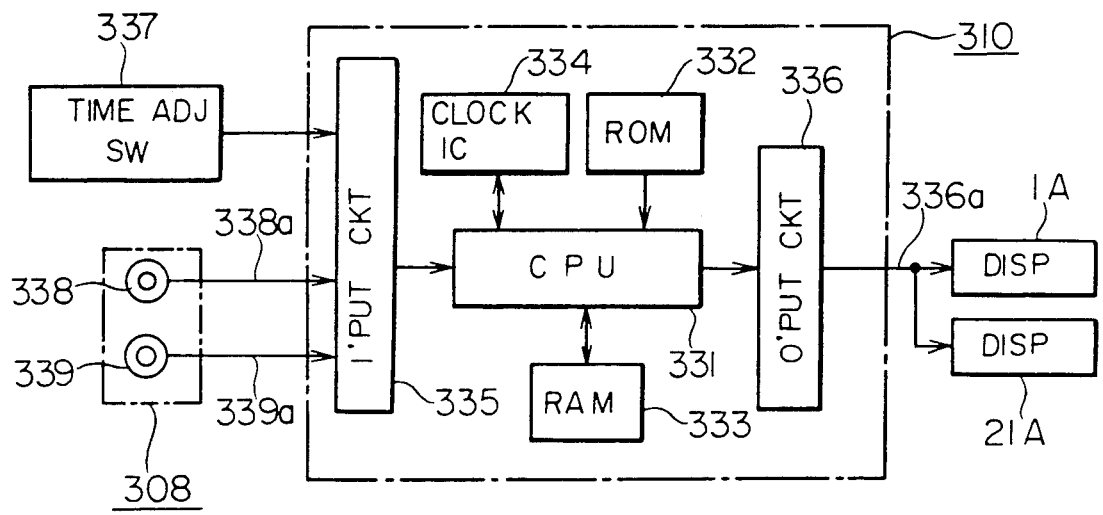

FIG. 22 is a system block diagram of the display control device 310. Referring to the figure, the display control device 310 is configured of a microcomputer, and it is constructed of a CPU 331, a ROM 332, a RAM 333, a clock IC 334, an input circuit 335 and an output circuit 336. A signal 336a which is delivered from the output circuit 336 is a coded display information signal which expresses the message to be displayed on the cage display unit 1A and the hall display unit 21A of the first floor. Numeral 337 indicates switches for adjusting the clock IC334. Numeral 338 indicates a weather adjustment switch which is closed (turned "on") for adjusting the weather condition of the weather forecase and opened (turned 37 off") upon the end of the adjustment, and which delivers an adjustment signal 338a that becomes "H" (a high level) during the turn-on. Numeral 339 indicates a weather selection switch which serves to designate the content of weather, and which delivers a selection switch signal 339a that expresses weather No. (any of 1-3) corresponding to the weather content.

Figure 23:
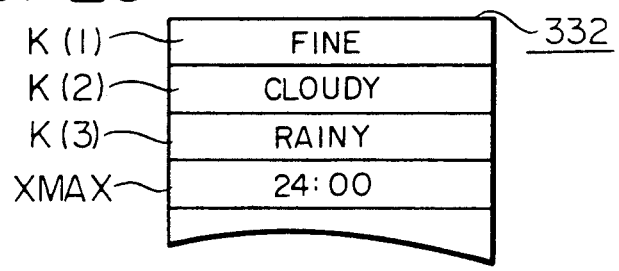

FIG. 23 is a diagram showing a plurality of sorts of weather contents etc. stored in the ROM 332 of the display control device 310. Stored here are coded data items K(1), K(2) and K(3) which express conditions "FINE," "CLOUDY" and "RAINY" corresponding to the values (=1-3) of the selection switlch signal 339a, respectively, and a prescribed interval data item XMAX (=24:00) which expresses the length of a time interval that renders the display of the weather forecase invalid when the content of weather is left intact after having been adjsuted.

Next, the operation of the display control device 310 for the elevator will be described in accordance with a flow chart in FIG. 24. The operation based on this flow chart is executed by a calculation program which is stored in the ROM 332.

Figure 24:
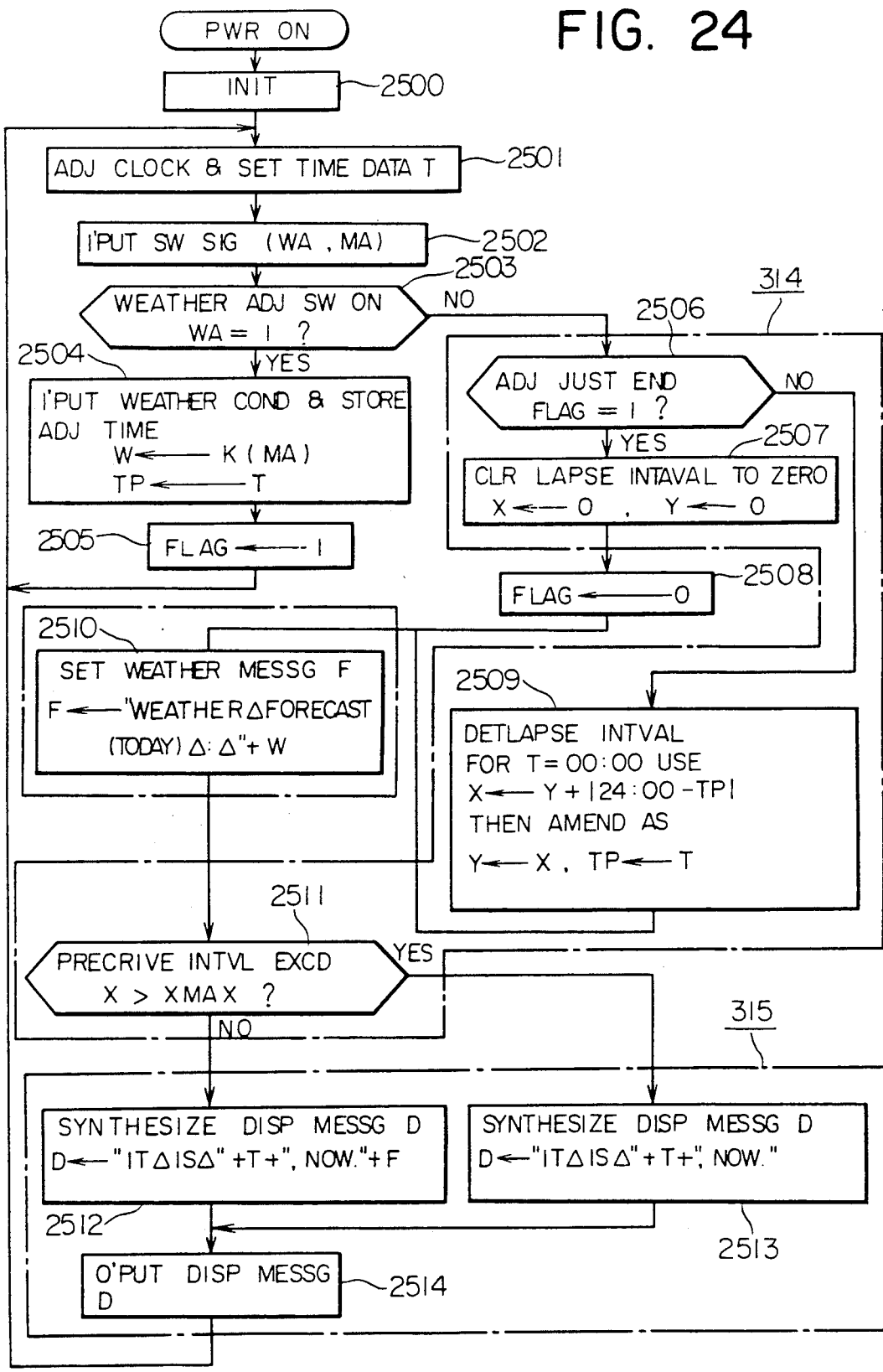

Referring to FIG. 24, when a power source is first turned "on," the device is initialized at a step 2500. At the initializing step 2500, data in the RAM 333 is set to predetermined values such as "0," and the clock IC 334 is reset. After the initializing step 2500 has ended, the processes of steps 2501-2514 are repeatedly executed.

At the step 2501, set signals are accepted from the clock adjustment switches 337 through the input circuit 335, to adjsut the clock IC334 to a designated time. Besides, the time (o'clock: minutes) is input from the clock IC334, to set time data T in the RAM 333. At the next step 2502, the adjustment signal 338a and the selection signal 339a are respectively input from the weather adjustment switch 338 and the weather selection switch 339, to set weather under-adjustment data WA (set at WA="1" when the adjustment signal 338a is "H") and the weather No. data MA(=1-3) in the RAM 333.

Subsequently, the step 2503 decides whether or not the weather condition of the weather forecase is under adjustment. If it is uner adjustment on this occasion, the under-adjustment data WA is "1," and hence, the control flow proceeds to the step 2504. Here, the weather data K(MA) corresponding to the weather No. data MA is set in the RAM 333 as the weather data W to-be-displayed, and the time T on this occasion is simultaneously set in the RAM 333 as adjustment time TP. At the next step 2505, a flag FLAG for detecting the end of the setting is set to "1." Thereafter, the control flow returns to the step 2501 again. That is, the processes of the steps 2506-2514 are not executed while the weather condition is being adjusted with the adjustment switch 338 and the weather selection switch 339.

When the weather adjustment switch 338 is turned "off" owing to the end of the designation of the weather condition, the under-adjustment data WA becomes "0" this time, and hence, the control flow proceeds to the step 2506. This step 2506 decides whether or not the adjustment has just ended. If the adjustment has just ended, lapse interval data items X and Y are cleared to zero at the step 2507, and the flag FLAG is reset to "0" at the step 2508. Unless the adjustment has just ended, the control flow proceeds to the step 2509, at which the lapse interval X since the last adjustment of the weather condition and the lapse interval Y till the preceding day are calculated. The lapse interval X since the last adjustment of the weather condition is evaluated in such a way that a lapse interval |T−TP| (for the time T=00:00, T=24:00 is substituted in the calculation) since the adjustment time TP is added to the lapse interval Y till the preceding day. Besides, the lapse interval Y till the preceding day is set equal to the lapse interval X when the time T has become 00:00 (that is, the date has changed). On this occasion, the amendment of setting the current time T (=00:00) as the adjustment time TP is required.

At the next step 2510, a weather forecast message F is set. Here, a sentence necessary for the display of the weather forecast (="WEATHERΔFORECAST-(TODAY)Δ:Δ") and the weather data W set at the step 2504 are synthesized to generate the weather forecast message F, which is set in the RAM 333. In the above, Δ denotes a blank.

Figure 25:
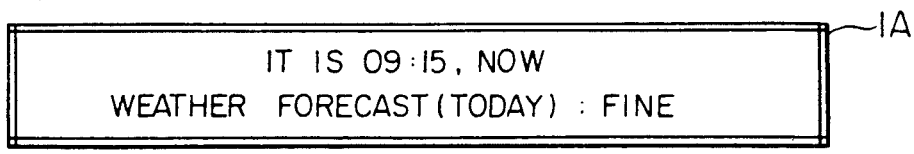

The step 2511 decides whether or not the lapse interval X since the last weather adjustment has exceeded the prescribed interval XMAX. Until the lapse interval X exceeds the prescribed interval XMAX, the step 2512 synthesizes a time display message (="ITΔISΔ"+T+",NOW.") and the weather forecast message F, to generate display message data D and set it in the RAM 333. At the step 2514, the message data D is transferred to the display units 1A and 21A through the output circuit 336 as the display information signal 336a successively code by code. Thus, a display is presented on the cage display unit 1A as illustrated in FIG. 25 by way of example. When the message has been entirely displayed, the control flow returns to the step 2501, and similar processes are repeated.

Figure 26:
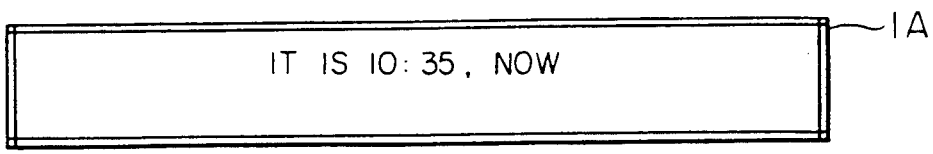

Meanwhile, when the lapse interval X has exceeded the prescribed interval XMAX at the step 2511, the control flow proceeds to the step 2513 this time. Here, only the time display message (="ITΔISΔ"+T+",-NOW.") is generated as the display message data D, and the weather forecast message F is deleted. Accordingly, a message is displayed on the cage display unit 1A as illustrated in FIG. 26 by way of example.

In this manner, the embodiment consists in a display apparatus wherein a weather forecast is displayed on a display unit in a cage or a hall and wherein the weather condition of the weather forecast can be changed by the use of an adjustment switch and a selection switch, characterized in that the display of the weather forecast is prevented when the next adjustment of the weather condition is not made before the lapse of a prescribed interval since the last adjustment of the weather condition. Therefore, even when a caretaker et al. have forgotten to set the weather condition, this does not form a cause for troubling users.

Figure 27:
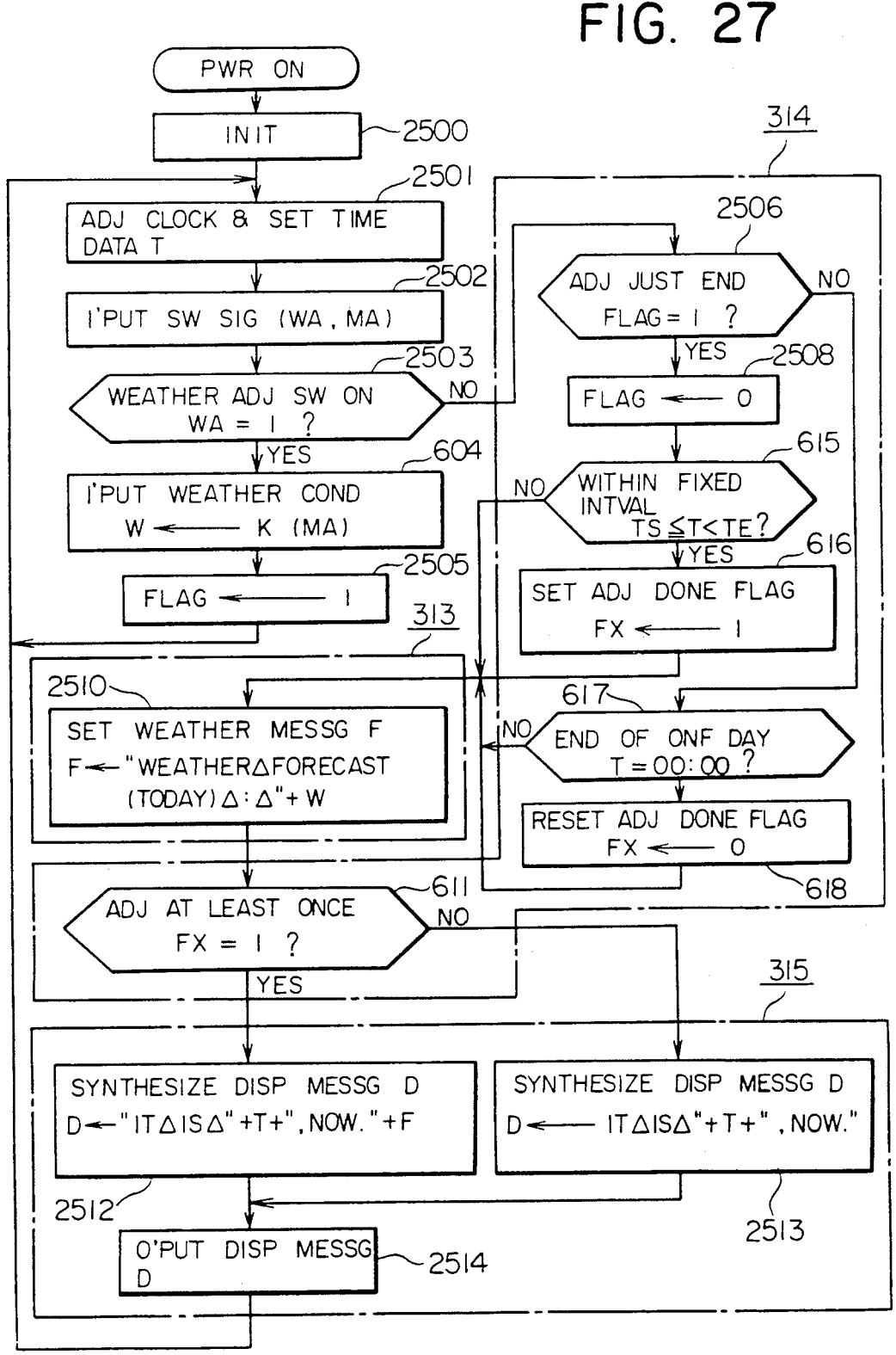
FIG. 27 is a flow chart showing a fifth embodiment of this invention.

FIG. 27 illustrates the fifth embodiment of this invention, and is a diagram corresponding to FIG. 24 of the fourth embodiment. According to the fifth embodiment, a unit period is set at one day, a time zone from the time 00:00 to the time 09:00 included therein is set as a fixed interval, and when the weather condition is not adjusted within the fixed interval, the display of the weather forecast is not presented on that day.

Steps 2500–2503 in FIG. 27 are the same as those of the fourth embodiment (in FIG. 24), and shall not be described in detail. When the weather adjustment switch 338 is "on" at the step 2503, the processes of steps 604 and 2505 are executed to set the weather data W(=K(MA)) and the flag FLAG (="1") respectively. When the adjustment of the weather condition has ended, the control flow proceeds along steps 2503→2506→2508, at which the flag FLAG is reset to "0." A step 615 decides whether or not the point of time at which the adjustment has just ended is included within the fixed interval [TS, TE]. If the point of time is included within the fixed interval [TS, TE], a step 616 sets to "1" a flag FX for expressing that the adjustment of the weather condition has been made within the fixed interval. Here, TS and TE denote data items expressing the start time and end time of the fixed interval, and TS=00:00 and TE=09:00 are set in the ROM 332, respectively.

When the step 2506 decides that the adjustment has not just ended, the control flow proceeds to a step 617, which decides whether or not the current time is the end of one day, namely, the time data T is 00:00. If the end of one day holds true, the adjustment-done flag FX is reset to "0" at a step 618 so as to get ready for the display of the weather forecast of the next day.

At a step 2510, the weather forecast message F is generated in the same way as in the fourth embodiment (in FIG. 24). Thereafter, a step 611 decides whether or not the adjustment of the weather condition has been done at least once within the fixed interval [TS, TE]. When the adjustment of the weather condition has been done within the fixed interval [TS, TE] (when FX="1" holds), the display message D including the weather forecast message F is synthesized at a step 2512, and it is transferred to the display units 1A and 21A at a step 2514. If the adjustment-done flag FX is "0", then the display message D from the weather forecast message F is deleted that is, only the time display data is generated at a step 2513.

When the output of the display message D at the step 2514 has ended, the control flow returns to the step 2501 again, and similar processes are repeated.

In this manner, the embodiment consists in a display apparatus wherein a weather forecast is displayed on a display unit in a cage or a hall and wherein the weather condition of the weather forecast can be changed by the use of an adjustment switch and a selection switch, characterized in that when the weather condition has not been adjusted within a fixed time interval previously determined during one day, the display of the weather forecast is thereafter prevented. Therefore, even when a caretaker et al. have forgotten to set the weather condition, this does not form a cause for troubling users.

Although, in the fourth and fifth embodiments, the weather forecast and the weather condition (the sky conditions) have been respectively handled as information whose content fluctuates with the lapse of time and as the fluctuant element thereof, this invention is of course applicable to information items regarding other weather factors, market trends, etc. as stated before.

Besides, although each of the fourth and fifth embodiments has employed a switch as input means for designating the content of the information element which fluctuates with the lapse of time, the input means is not restricted to the switch. This invention is readily applicable even when the content of the fluctuant element is input with, for example, an MPU and a keyboard as disclosed in the official gazette of Japanese Patent Application Laid-open No. 60-167871 mentioned before.

Further, although in the fourth embodiment the prescribed interval XMAX expressing the length of an interval for deciding the invalidity of a display has been set at 24:00 (o'clock: minutes) with respect to the weather forecast, the set value of the prescribed interval XMAX is not restricted thereto. Also, although in the fifth embodiment a unit period has been set at one day and a fixed interval has been set at 00:00–09:00, the set values of the unit period and the fixed interval are not restricted thereto. When the unit period is set at one hour, 12 hours, one week, 10 days, one month, a half year or one year, the fixed period may be set so as to be included within the period. Such a prescribed interval XMAX and fixed interval need to be properly set according to the sort of information whose content fluctuates with the lapse of time.

As thus far described, the fourth or fifth embodiment consists in a display apparatus for an elevator having a display unit which is diposed in the cage or hall of the elevator, input means for designating the elemental content of information containing an element fluctuant with the lapse of time, and display control means for displaying the information on the display unit in accordance with the designation of the input means, characterized by a construction in which upon detecting that the elemental content of the information has not been designated by the input means within a time interval set by inhibition means, a command for inhibiting the display of the information is issued to inhibit the display of the information. Therefore, even when the caretaker et al. of a building have failed to update the content of the information, users are not troubled by the cause of untimely information.

What is claimed is:

1. In a display apparatus for an elevator having a display unit which is disposed in a cage or hall of the elevator, display control means for displaying a message to be reported to users in a designated display aspect of the display unit, and display aspect correction means connected to the display control means for designating the display aspect, said display aspect correction means comprising simulation means for simulatively displaying a predetermined message in an aspect corresponding to the designated display aspect.

2. A display apparatus for an elevator as defined in claim 1 wherein said display aspect correction means comprises means for designating a scroll speed of the message display as the display aspect, and said simulation means scroll-displays the predetermined message at a speed corresponding to the designated scroll speed.

3. A display apparatus for an elevator as defined in claim 1 wherein said display aspect correction means comprises means to designate a flickering factor of a flickering display of the message as the display aspect, and said simulation means displays the predetermined message in correspondence with the designated flickering factor.

4. A display apparatus for an elevator as defined in claim 1 wherein said display aspect correction means comprises means to designate a flickering period of a flickering display of the message as a display aspect, and said simulation means displays the predetermined message in correspondence with the designated flickering period.

5. In a display apparatus for an elevator having a display unit which is disposed in a cage or hall of the elevator, display control means for displaying a message to be reported to users in a designated display aspect ont the display unit, and display aspect correction means connected to the display control means for designating the display aspect, said display aspect correction means comprising scroll speed alteration means for designating a scroll speed of the message display, and said display control means comprising flickering parameter-setting means for setting a parameter which is preset in correspondence with the designated scroll speed and which alters an aspect of a flickering display of the message.

6. A display apparatus for an elevator as defined in claim 5 wherein said display control means further comprises first memory means for storing a plurality of preset items of fixed display information, second memory means for storing correction display information applied from said correction means in correspondence with the fixed display information to-be-corrected among the plurality of items of fixed display information, and selection means for detecting whether the correction display information is stored in correspondence with the message to-be-displayed and operating in accordance with stored contents of said first and second memory means to read out and deliver the correction display information from said second memroy means when it is stored therein and to read out and deliver information corresponding to the message to-be-displayed from said first memory means when the correction display information is not stored in said second memory means.

7. In a display apparatus for an elevator having a display unit which is disposed in a cage or hall of the elevator, display control means for displaying a message to be reported to users in a designated display aspect on the display unit, and display aspect correction means connected to the display control means for designating the display aspect wherein a message which is displayed on said display unit contains an information element which becomes invalid with the lapse of time, said display aspect correction means including input means for correcting the information element to the latest content, and said display control means including a display inhibition means which is operated in accordance with the presence or absence of a correction input from said input means to give a command for inhibiting the display of the message containing an uncorrected information element when it is detected that the correction of the information element by said input means has not been made within a set time interval.

8. A display apparatus for an elevator as defined in claim 7 wherein said display inhibition means gives the command for inhibiting the display of the message containing the information element, upon detecting that the correction of a content of the information element has not been made before the fixed time interval lapses since the last correction of the content of the information element by said input means.

9. A display apparatus for an elevator as defined in claim 7 wherein said display inhibition means gives the command for inhibiting the display of the message containing the uncorrected information element, upon detecting the correction of a content of the information element by said input means has not been made in a predetermined time zone.

* * * * *

UNITED STATES PATENT AND TRADEMARK OFFICE
CERTIFICATE OF CORRECTION

PATENT NO. : 5,056,629
DATED : OCTOBER 15, 1991
INVENTOR(S) : TSUJI ET AL.

It is certified that error appears in the above-identified patent and that said Letters Patent is hereby corrected as shown below:

Claim 5, Column 23, line 56, change "ont" to --on--.

Claim 6, Column 24, line 19, change "memroy" to --memory--.

Claim 9, Column 24, line 57, after "tecting" insert --that--.

Signed and Sealed this

Twentieth Day of April, 1993

Attest:

MICHAEL K. KIRK

*Attesting Officer*   Acting Commissioner of Patents and Trademarks